Oct. 25, 1966          G. L. BROWN          3,280,935
SEISMIC TORSIONAL WAVE GENERATOR
Filed May 27, 1963                          6 Sheets-Sheet 1

INVENTOR.
GRAYDON L. BROWN
BY William J. Miller
ATTORNEY

Oct. 25, 1966  G. L. BROWN  3,280,935
SEISMIC TORSIONAL WAVE GENERATOR
Filed May 27, 1963  6 Sheets-Sheet 2

INVENTOR.
GRAYDON L. BROWN
BY William J. Miller
ATTORNEY

INVENTOR.
GRAYDON L. BROWN
BY William J. Miller
ATTORNEY

Oct. 25, 1966 G. L. BROWN 3,280,935
SEISMIC TORSIONAL WAVE GENERATOR
Filed May 27, 1963 6 Sheets-Sheet 4

INVENTOR.
GRAYDON L. BROWN
BY
*William J. Miller*
ATTORNEY

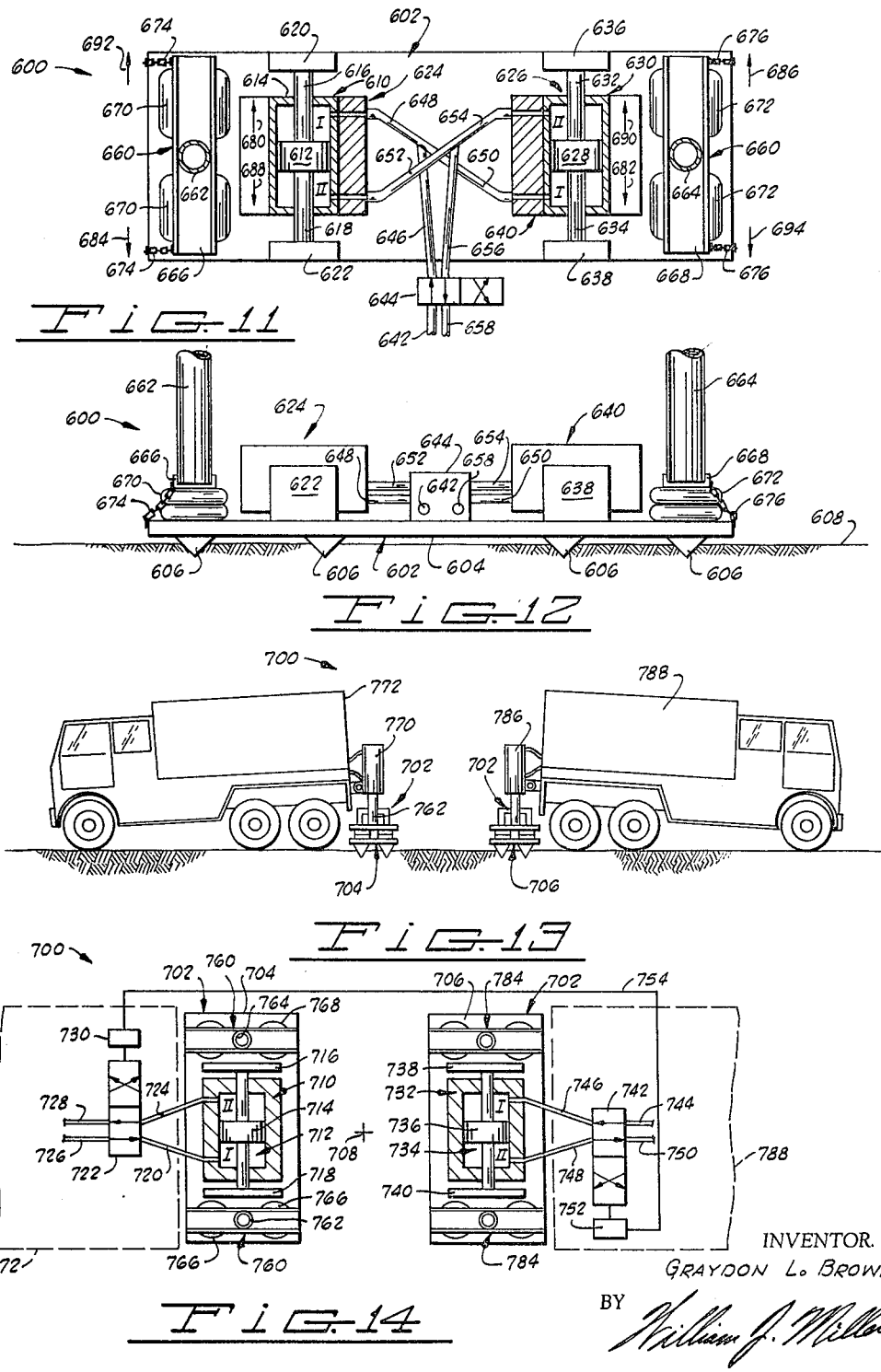

Oct. 25, 1966 G. L. BROWN 3,280,935
SEISMIC TORSIONAL WAVE GENERATOR
Filed May 27, 1963 6 Sheets-Sheet 6

INVENTOR.
GRAYDON L. BROWN
BY William J. Miller
ATTORNEY

United States Patent Office 3,280,935
Patented Oct. 25, 1966

3,280,935
SEISMIC TORSIONAL WAVE GENERATOR
Graydon L. Brown, Ponca City, Okla., assignor to Continental Oil Company, Ponca City, Okla., a corporation of Oklahoma
Filed May 27, 1963, Ser. No. 283,469
24 Claims. (Cl. 181—.5)

The present invention relates to transducers and more particularly, but not by way of limitations, relates to a device for inducing seismic torsional waves having a controllable frequency of prolonged duration in the earth for seismographic surveying purposes.

There are two general types of wave signals which will propagate through the earth as the result of a physical disturbance at the surface in such a manner as to be reflected from subterranean interfaces and thereby be useable for seismographic surveying purposes. The most common is the so-called pressure wave which is sometimes referred to as a compression or longitudinal wave because the earth particle motion is in the direction of wave propagation. The other is the shear wave, so called because it results from particle motion generally normal to the direction of wave propagation. Shear waves can further be categorized as vertical, horizontal or torsional shear waves. When the particle motion is rectilinear and is oriented normal to the incidence plane, which is defined as a vertical plane passing through both the surface point of origin and the surface point of detection of the wave, the wave may be defined as a horizontal shear (SH) wave. When the particle motion is oriented within the incidence plane, the wave may be defined as a vertical shear (SV) wave. Or if the particles have rotary motion about an axis extending in the direction of propagation, the wave may be defined as a torsional shear wave.

In copending U.S. patent application Serial No. 237,661, entitled "Method and Apparatus for Inducing Seismic Shear Waves in the Earth and for Seismic Surveying," and assigned to the assignee of the present invention, a method and apparatus for generating seismic torsional waves in the earth is described. In general, the method for generating the torsional shear waves entailed coupling a member to the surface of the earth and oscillating the member about a vertically disposed axis. When the member is oscillated in this manner, a highly directional torsional wave will be generated which will travel primarily along the axis of oscillation downwardly into the earth and will be reflected from various subterranean interfaces. The reflected signals can be detected by a torsional geophone which is similarly constructed in that the member which is connected to the earth is sensitive to earth particle motion about a vertical axis. Incidental to the generation of the torsional waves, seismic shear waves, both vertical and horizontal, are also generated and these waves will propagate primarily radially outwardly from the transducer through the shallow layers of the earth. As taught in the above referenced copending application, these shear waves can be used to advantage to cancel shear waves generated by linear shear wave transducers. The present invention is concerned with a device for generating both the torsional waves and the shear waves in accordance with the teachings of the referenced application, although for ease of reference and in order to avoid confusing the device of the present invention with rectilinear shear wave transducers, the device constructed in accordance with the present invention will hereafter be referred to as a torsional wave transducer.

The existence of shear waves has been known for many years and many attempts have been made to generate both horizontal and vertical shear waves, and a few attempts have been made to generate torsional shear waves. However, in all cases these attempts were largely unsuccessful insofar as is known, primarily it is believed because the devices which were constructed to generate the special types of seismic waves were not capable of generating enough seismic energy of a sufficient level to overcome noise and other adverse factors and produce useful information for seismographic surveying purposes. In all known cases, the devices heretofore used for this purpose attempted only to generate a single or instantaneous pulse of approximately one significant wave length. These devices usually entailed anchoring a member to the earth by various complicated means and then striking the member with another member in a horizontal or rotary direction. In addition to being extremely expensive in that each generation site had to be specially prepared in order to anchor the member to the earth, the devices were incapable of generating sufficient energy as to be practical. Therefore, workers in the art have heretofore generally been resigned to the fact that shear waves, either SH or SV, and in particular torsional waves, were unsuitable for seismographic exploration purposes.

As taught in U.S. Patent No. 2,688,124, issued to William E. N. Doty et al. on August 31, 1954, the required energy level of seismic signals can be substantially reduced if the frequency content of the signals can be controlled with precision. For example, it has been found that a large number of seismic signals produced by a seismic wave having a controlled, nonrepetitive frequency of prolonged duration, such as several seconds, can be composited to amplify the seismic signal relative to random noise, and then can be correlated with the transmitted signal of known frequency content to determine the arrival times of the reflected signals and accurately locate the subterranean strata.

Therefore an important object of the present invention is to provide a device for generating seismic torsional waves, as well as the other types of seismic shear waves, having a sufficiently high energy level to be useful in seismographic exploration work.

It is also an object of the present invention to provide a device for generating seismic torsional waves having a controlled frequency of prolonged duration so that the methods of compositing and correlating previously mentioned can be used to facilitate the interpretation of the resulting seismic data.

Another object of the present invention is to provide a device of the type described which may be transported by a truck or the like, and which can easily and rapidly be coupled to the surface of the earth in order to generate the desired seismic waves at a large number of different points.

Still another object of the present invention is to provide a device of the type described which can be electrically powered.

Yet another object of the present invention is to provide a device of the type described which can be hydraulically powered.

A still further object of the present invention is to provide a device of the type described which may be powered by a rotating prime mover.

Another object of the present invention is to provide a device of the type described which will result in minimum vibration of a transporting vehicle.

Another object of the present invention is to provide a device of the type described which can be divided into a number of different pieces of equipment, each of maximum size capable of being transported by a separate vehicle, and which can be very rapidly set up for operation at a wave generation site.

Yet another object of the present invention is to provide a method for generating seismic torsional waves of high energy level using a plurality of pieces of equipment each of which can be transported by a separate truck and which can also be used to generate both horizontal and vertical shear waves in addition to torsional waves.

Another object of the present invention is to provide a device of the type described which can be economically manufactured and operated and which will have a long and trouble free service life.

Many additional objects and advantages of the present invention will be evident to those skilled in the art from the following detailed description and drawings, wherein:

FIG. 11 is a plan view, partially in section, of another embodiment of the present invention;

FIG. 12 is a side elevational view of the device of FIG. 11;

FIG. 13 is a wide elevational view of still another device constructed in accordance with the present invention;

FIG. 14 is a plan view, partially in section, of the device of FIG. 13 with the transporting vehicles shown in dotted outline;

Figure 1:
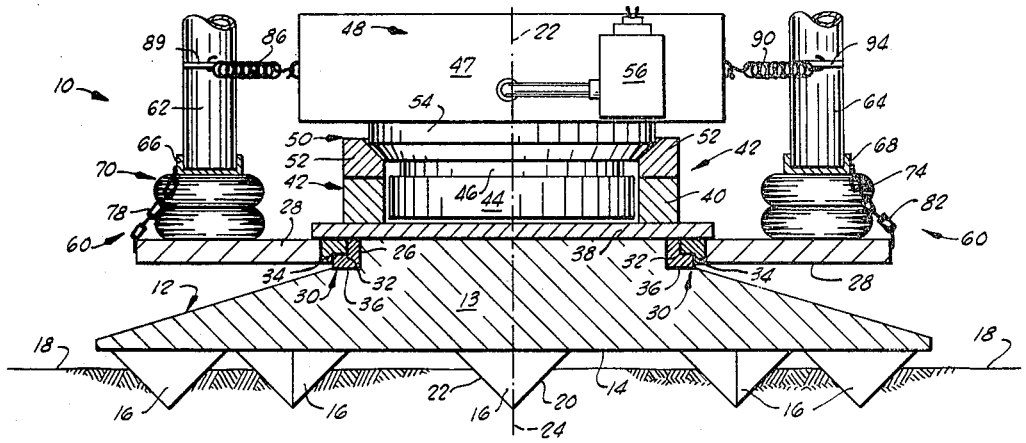
FIG. 1 is a side elevational view, partially in section, of a device constructed in accordance with the present invention.
Figure 2:
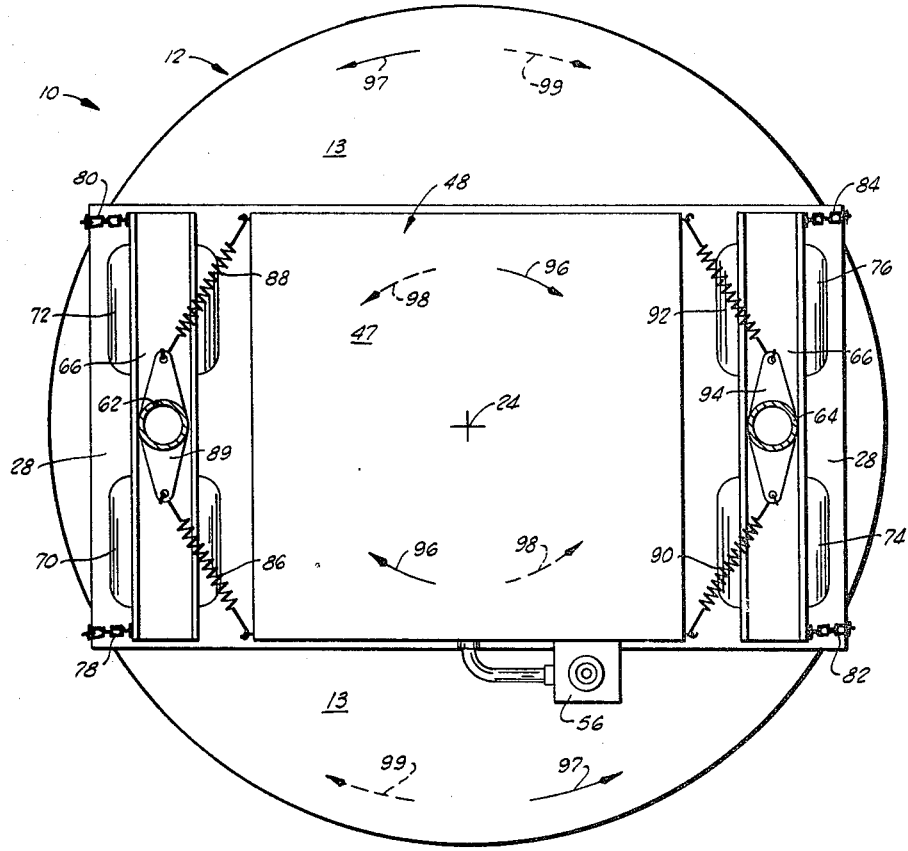
FIG. 2 is a plan view of the device of FIG. 1.
Figure 3:
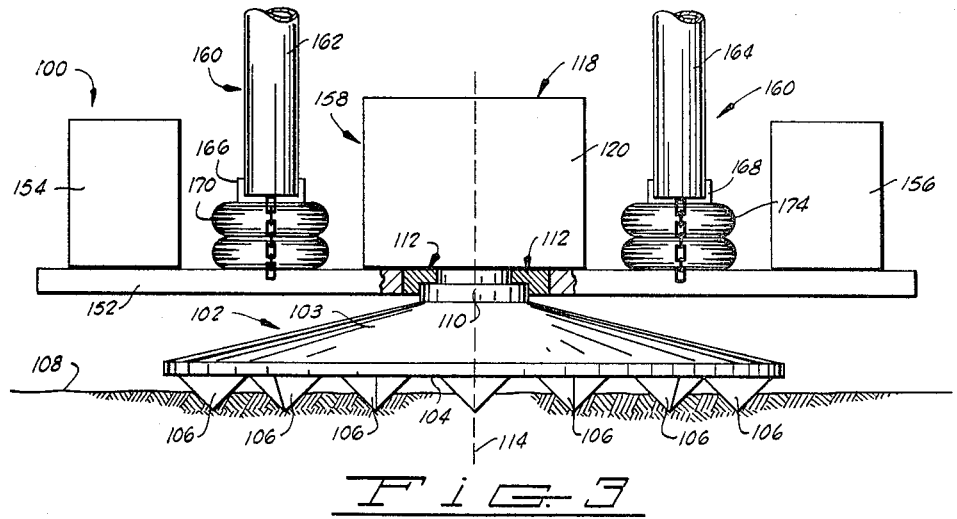
FIG. 3 is a side elevational view of another device constructed in accordance with the present invention.

Referring now to the drawings, and in particular to FIGS. 1 and 2, a device constructed in accordance with the present invention is indicated generally by the reference numeral 10. The device 10 is comprised of an earth coupling member indicated generally by the reference numeral 12. The earth coupling member 12 has a main body 13 which may conveniently be circular, as can best be seen in FIG. 2, but may be substantially any shape. The earth coupling member 12 has an axis of oscillation 24 which will in most cases be its geometric center. The bottom face 14 of the body 13 of the earth coupling member 12 is generally planar and preferably has a plurality of relatively large projections 16 for penetrating the surface 18 of the earth and securely connecting the coupling member to the earth. The projections 16 preferably have a pyramidal shape with relatively sharp, downwardly facing points and relatively large bases. The pyramids 16 should be so oriented that two opposing faces, for example faces 20 and 22, are disposed generally parallel to a line radiating from the axis of oscillating 24. The earth coupling member 12 may increase in thickness toward the center and has a cylindrical portion 26 of fairly large diameter which extends upwardly through an aperture in a horizontal plate member 28. A circular thrust bearing, indicated generally by the reference numeral 30, is operatively disposed between the earth coupling member 12 and the horizontal plate member 28. The thrust bearing 30 may be of any suitable construction but is illustrated as comprised of a pair of brass bearing halves 32 and 34. The annular brass bearing half 32 may conveniently be tightly fitted around the cylindrical portion 26 and rest on an annular shoulder 36 as best seen in FIG. 1. A disc-shaped plate 38 may be bolted to the upper end of the cylindrical portion of the earth coupling member 12 in order to hold the bearing half 32 in place. The plate 38 also extends outwardly over the bearing half 34 and overlaps the plate 28 so as to provide a means for lifting the coupling plate member 12 and the other active parts of the device 10, as will hereafter be described. The bearing half 34 may be secured to the plate 28 in any suitable manner.

The stator ring 40 of a D.C. wound electric motor, indicated generally by the reference numeral 42, is bolted or otherwise connected to the disc-shaped plate 38 and therefore to the coupling member 12. The armature 44 of the electric motor 42 is rotatably disposed within the stator ring 40 and is connected by a suitable large diameter shaft 46 to the mass block 47 of a relatively high inertial mass member indicated generally by the reference numeral 48. A second thrust bearing means, indicated generally by the reference numeral 50, is operatively disposed between the inertial mass member 48 and the earth coupling member 12. The second thrust bearing means 50 may be comprised of an annular bearing half 52, which is connected to the stator ring 40, and an annular bearing half 54 which is disposed around and connected to the shaft 46 and therefore to the inertial mass member 48. At this point it should be noted that the earth coupling member 12 is comprised of the main body 13, the projections 16, the bearing half 32, the disc-shaped plate 38, the stator ring 40, and the bearing half 52. By the same token, the inertial mass member 48 is comprised of the armature 44, the shaft 46, the bearing half 54 and the mass block 47.

As mentioned, the electric motor 42 is a conventional D.C. wound motor which, if supplied with D.C. current, would have a single direction of rotation and would have maximum torque just prior to stalling. The motor 42 is preferably of the so-called pancake type and has substantially the proportionate dimensions illustrated. This type of motor is well known and commercially available and may be obtained in substantially any size from a few inches to many feet in diameter and having a high torque. Since it is desired to oscillate the inertial mass member 48 relative to the earth coupling member 12 about the vertically disposed axis of oscillation 24, as will hereafter be described in greater detail, the D.C. wound electric motor 42 is driven by an A.C. power source indicated generally by the reference numeral 56. The A.C. power source 56 may be of any suitable design, but may conveniently comprise a synchronous inverter of the type which utilizes a silicon controlled rectifier bridge for inverting a D.C. power source, such as a group of storage batteries or the like, to a square wave alternating current synchronized with a reference signal.

A transport means for both lifting the device 10 for transport and for applying a static holddown load to the earth coupling member 12 is indicated generally by the reference numeral 60. The transporting means 60 may be comprised of a pair of upright members 62 and 64 which are connected to any suitable hydraulic lift mechanism (not illustrated) mounted on a truck. Such a lift mechanism is described in U.S. Patent No. 3,024,861, and in addition to having the capability of exerting an upwardly directed force upon the members 62 and 64 sufficient to lift the entire device 10, the mechanism is also capable of utilizing a major portion of the weight of the truck to exert a downwardly directed force on the upright members 62 and 64 so as to apply a static holddown load to the earth coupling member 12, as will presently be described. Horizontally disposed channel members 66 and 68 are connected to the bottom ends of the upright members 62 and 64 and may be considered as forming a part of the upright members.

A plurality of shock absorber means for transmitting a downwardly directed load while absorbing all components of vibration are indicated generally by the reference numerals 70 and 72 and are disposed between the horizontal channels 66 of the upright member 62 and the horizontally disposed plate 28. The shock absorber means 70 and 72 may be comprised of a pair of pneumatically inflated, flexible pillow bags which may be vulcanized or otherwise adhered to the horizontally disposed channel 66, to the horizontally disposed plate 28, and to each other. A similar pair of shock absorber means are indicated generally by the reference numerals 74 and 76 and are disposed between the horizontal channel 68 of the upright member 64 and the other end of the horizontal plate 28.

A pair of loosely strung, flexible tension members 78 and 80, such as short lengths of chain, interconnect the ends of the horizontal channel 66 and the end of the plate 28. A similar pair of loosely strung, flexible tension members 82 and 84 interconnect the ends of the channel 68 and the other end of the horizontal plate 28. The tension members are loosely strung so as to permit free movement of the plate 28, both vertically and horizontally, relative to the horizontal channels 66 and 68 when the shock absorber means are subjected to a vertical load and compressed vertically. However, the tension members are sufficiently short as to tighten and lift the plate 28 and the remainder of the device 10 as the upright members 62 and 64 are raised before the shock absorber means are torn by the tension force.

A pair of centering springs 86 and 88 interconnect the corners of the mass block 47 and a bracket 89 connected to the upright member 62. A similar pair of centering springs 90 and 92 interconnect the other two corners of the mass block 47 and a bracket 94 which is connected to the other upright member 64. The springs 86, 88, 90 and 92 prevent rotational meandering of the inertial mass member 48 which, it will be noted, is otherwise free to rotate with respect to the transport means 60, and maintains the mass member in the desired position. The centering springs should be relatively long and relatively weak so as not to interfere with the oscillatory motion of the reaction mass member 48 about the axis of oscillation 24, as will presently be described. Since the earth coupling member 12 is circular, as illustrated, and there are no electrical connections to the stator ring 40, because it is a permanent magnet, it will not be necessary to provide a means for maintaining the earth coupling member 12 in a predetermined position relative to the remainder of the device. However, if the earth coupling member 12 is elongated rather than round, it may be desirable to provide similar centering means, such as springs extending between the plate 28 and the body of the earth coupling member, for example, or angular position feedback circuit means for controlling the electric power.

In operation, the device 10 is transported by a suitable vehicle (not illustrated) by applying upwardly directed forces to the upright members 62 and 64. The upwardly directed forces will be transmitted through the four tension members 78, 80, 82 and 84 to the horizontal plate member 28, and then to the disc-shaped plate 38 which extends out over the plate 28 substantially as illustrated in FIG. 1. Since the plate 38 is an integral part of the earth coupling member 12, and since the inertial mass member 48 rests on the earth coupling member, both members will be lifted from the ground by the force.

When it is desired to generate a seismic torsional wave in the earth, the device 10 is merely lowered until the earth coupling member 12 engages the surface 18 of the earth. Then a downwardly directed holddown force is applied to the upright members 62 and 64 by utilizing a portion of the weight of the transporting truck. The holddown force is transmitted through the shock absorber means 70, 72, 74 and 76 to the horizontal plate member 28 and then through the thrust bearing means 30 to the earth coupling member 12. As previously mentioned, when the shock absorber means 70, 72, 74 and 76 are compressed by the downwardly directed load, the tension members 78, 80, 82 and 84 will become loose so as to effectively permit any vibratory motion within reasonable limits, of course, between the horizontal plate member 28 and the upright members 62 and 64 so that the downwardly directed load may be considered as static. The weight of the inertial mass member 48 will also be applied to the earth coupling member 12 through the thrust bearing 50, and the combined loads will force the projections 16 to penetrate the surface 18 of the earth to a depth depending upon the hardness of the soil. However, the face 14 should not contact the surface 18 of the earth or the projections 16 will tend to wallow out a hole and the coupling member 12 will be uncoupled from the earth and very little seismic energy will be generated in the manner hereafter described.

When the D.C. wound electrical motor 42 is energized by the alternating current from the A.C. power source 56, the stator ring 40 and the armature 44 will of course be oscillated relative to each other about the axis of rotation of the motor which coincides with the axis of oscillation 24 and since the stator ring 40 forms a part of the earth coupling member 12 and the armature 44 forms a part of the inertial mass member 48, these members will also be oscillated relative to each other about the axis of oscillation 24. Therefore, when referring to FIG. 2, if the inertial mass member 48 including the armature 44, is accelerated clockwise in the direction of the solid arrows 96, a force of reaction or torque will act on the earth coupling member 12 in a counterclockwise direction, as indicated by the arrows 97. Then as the inertial mass member 48 is accelerated in the counterclockwise direction as represented by the dotted arrows 98, a clockwise force of reaction or torque will be exerted to the earth coupling member 12 in the direction of the dotted arrows 99. The reversing torques applied to the earth coupling member 12 which is securely coupled to the surface 18 of the earth by the projections 16 will then generate a seismic torsional wave which will be highly directional and will propagate primarily downwardly along the axis of oscillation. Further, horizontal and vertical shear waves will also be generated as previously described. Since the inertial mass member 48 can be quite large, as limited only by the lifting capacity of the transporting vehicle, considerable electrical power can be used to generate seismic energy of greater magnitude than could heretofore be generated and induced in the earth. Also, the seismic energy can be generated for a prolonged duration and at substantially any desired frequency rate so that the resulting seismographic data can later be composited and correlated, as previously mentioned. When the seismic signal transmission or "shot" is completed, the device 10 can again be quickly and easily lifted from the ground by the upright members 62 and 64 and transported by the vehicle to the next location where the procedure can be repeated.

Another device constructed in accordance with the present invention is indicated generally by the reference numeral 100. The device 100 comprises an earth coupling member 102 having a main body portion 103 with a generally planar bottom face 104 and a plurality of pyramidal-shaped, downwardly extending projections 105 for penetrating the surface 108 of the earth, as previously described in connection with the projections 16 of the device 10. The earth coupling member 102 may be fabricated in any suitable manner, such as by molding from aluminum, and is preferably as light as possible so as to have a greater frequency response. The earth coupling member 102 has a vertically disposed shaft 110 the lower portion of which forms a race for a thrust bearing which is indicated generally by the reference numeral 112, and which will hereafter be described in greater detail. The shaft 110 coincides with a vertically disposed axis of oscillation 114 which extends substantially through the geometric center of the earth coupling member 102.

Figure 4:
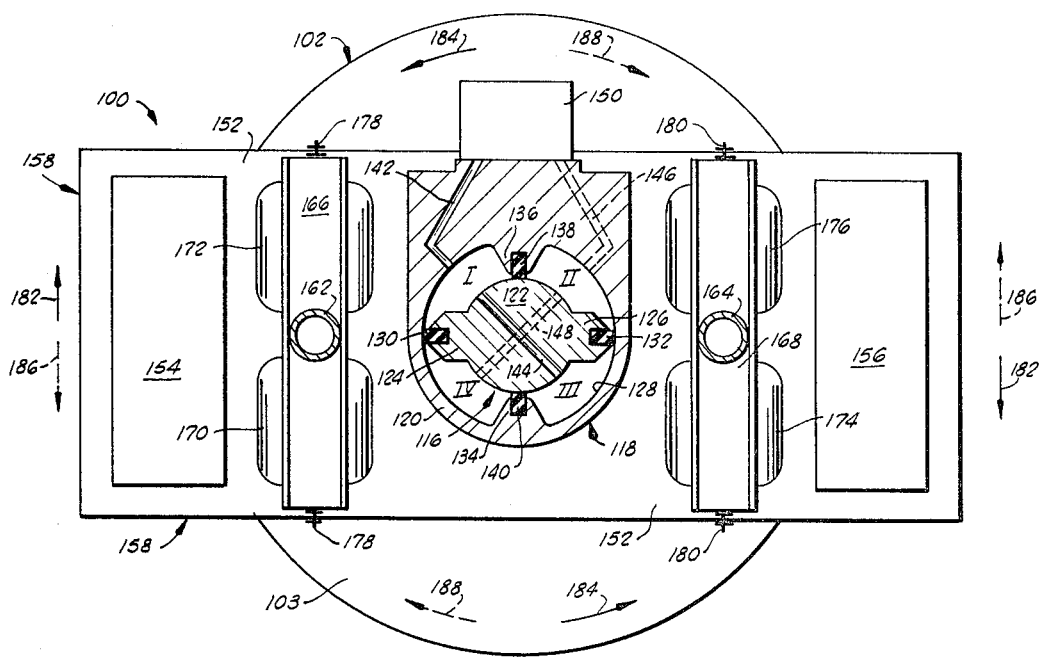
FIG. 4 is a plan view of the device of FIG. 3.

The upper end of the shaft 110 is connected to a vane-type rotor 116 (see FIG. 4) operatively disposed within a stator housing 120 of a vane-type hydraulic oscillating motor, indicated generally by the reference numeral 118. The rotor 116 has a generally cylindrical center portion 122 and a pair of vanes 124 and 126 which extend outwardly and are sealed against the cylindrical inner surface 128 of the stator housing 120 by suitable sealing means 130 and 132, respectively. The stator housing 120 has a pair of inwardly projecting stator vanes 134 and 136 which are sealed to the cylindrical center portion 122 of the vane-type rotor 116 by suitable sealing means 138 and 140. Thus it will be noted that the rotor vanes 124 and 126 and the stator vanes 134 and 136 divide the stator housing 120 into four chambers designated I, II, III and IV. A first fluid port 142 communicates with Chamber I. A second fluid port 144 extends through the cylindrical center portion 122 of the rotor 116 to provide fluid communication between Chambers I and III. A third fluid port 146 is in fluid communication with the Chamber II and a fourth fluid port 148 extending through the rotor 116 provides fluid communication between Chambers II and IV. A suitable four-way hydraulic valve 150 is provided to alternately, under the control of an electrically controlled servo system, direct power fluid to the port 142 while exhausting fluid from the port 146, and then direct fluid to the port 146 while exhausting fluid from the port 142.

The stator housing 120 of the hydraulic motor 118 is fixed to a horizontally disposed plate 152. A pair of mass blocks 154 and 156 are connected to the outer ends of the plate 152. Thus the stator housing 120, the plate 152 and the mass blocks 154 and 156 form an inertial mass member which is indicated generally by the reference numeral 158. The thrust bearing 112, previously mentioned, is operatively disposed between the inertial mass member 158 and the earth coupling member 102 so as to apply the load of the inertial mass member 158 to the earth coupling member 102 and also to transmit a static holddown load as will presently be described. Suitable bearing means (not illustrated) are also provided for exerting an upwardly directed force on the earth coupling member 102. In most cases the bearings of the hydraulic motor 118 will be sufficient for this purpose because the earth coupling member 102 will normally be light in weight, usually on the order of 500 pounds, and the load applied thereto will be substantially static because when lifted from the ground, the device 100 will not be in operation.

A suitable transport means similar to that previously described in connection with the device 10 is indicated generally by the reference numeral 160. The transport means 160 comprises a pair of upright members 162 and 164 for connection to the lift and holddown mechanism of a transporting vehicle (not illustrated) as previously described. A pair of horizontal channels 166 and 168 are connected to the bottoms of the upright members 162 and 164, respectively. A pair of shock absorbing means 170 and 172 disposed between the horizontal channel 166 and the horizontal plate 152 may conveniently comprise pneumatically inflated, flexible pillow bags of the type previously described. A similar pair of shock absorbing means 174 and 176 are disposed between the horizontal channel 168 and the horizontal plate 152. The shock absorber means are capable of transmitting a downwardly directed load and, at the same time, of absorbing vibration force components in both the horizontal and vertical directions. A pair of tension members 178 interconnect the ends of the horizontal chamber 166 and the horizontal plate 152, and a similar pair of tension members 180 interconnect the horizontal channel member 168 and the plate 152 for transmitting an upwardly directed force to the plate 152.

The fundamental operation of the device 100 is substantially identical to that of the device 10. The device 100 can be raised for transport by raising upwardly on the upright members 162 and 164. The tension force will be transmitted through the tension members 178 and 180 to the horizontal plate 152, through the bearing means (not illustrated) of the hydraulic motor 118 to the earth coupling member 102. Of course, the mass blocks 154 and 156 and the stator housing 120 are rigidly connected to the plate 152 and form the inertial mass member 158 and therefore will also be raised.

When it is desired to generate a seismic torsional wave, the device 100 is lowered until the earth coupling member 102 contacts the surface 108 of the earth. A downwardly directed static holddown load is then applied to the upright members 162 and 164 and is transmitted through the shock absorber means 170, 172, 174 and 176 to the plate 152 of the inertial mass member 158. The downwardly directed static load is then added to the total weight of the inertial mass member 158 and both loads are transmitted by the thrust bearing 112 to the earth coupling member 102 to force the projections 106 into the surface of the earth, as previously described in connection with the device 10, and securely couple the earth coupling member 102 to the earth.

Hydraulic power fluid is then directed by the valve 150 to the fluid port 142, for example. The power fluid passes into Chamber I and through the fluid port 144 into Chamber III. At the same time, hydraulic fluid is exhausted from Chamber IV through port 144 to Chamber II and then through port 146 back to the valve 150 and a suitable reservoir (not illustrated). The hydraulic power fluid in Chambers I and III will exert a force on the stator vanes 134 and 136 which will tend to rotate the inertial mass member 158 clockwise when referring to FIG. 4, as indicated by the solid arrows 182, about the axis of oscillation 114. As the inertial mass member 158 is accelerated in the clockwise direction, a reaction torque about the axis of oscillation 114 will be exerted on the earth coupling member 102 in the opposite, or counterclockwise direction, as represented by the solid arrows 184.

When the valve 150 directs hydraulic power fluid to the port 146 and connects the port 142 to exhaust, hydraulic power fluid will be directed into Chambers II and IV and the fluid within Chambers I and III will be exhausted. The high pressure fluid will then exert a force on the stator vanes 134 and 136 tending to rotate the inertial mass member 158 in a counterclockwise direction, as represented by the dotted arrows 186, relative to the axis of oscillation 114. This will produce a reaction torque on the earth coupling member 102 in the clockwise direction about the axis of oscillation 114, as represented by the dotted arrows 188. Of course it will be appreciated that the rotational stroke of the fluid motor 118 will be very short, depending to a large degree upon the frequency at which the motor is reversed.

As the earth coupling member 102 is oscillated about the vertical axis of oscillation 114 by the reversing reaction torques, the projections 106 will remain coupled to the earth, even for a relatively long period of time, and a torsional shear wave will be induced in the earth, as described above. Since the mass blocks 154 and 156 are located at the maximum distance from the axis of oscillation 114, it will be appreciated that relatively small weights will result in a relatively high inertial mass. Of course, the inertial mass member will be oscillated through a relatively short stroke about the axis of oscillation 114. However, the shock absorber means 170, 172, 174 and 176 will function as thrust bearings to isolate the rotational motion from the upright members 162 and 164 and therefore from the transporting truck. In this respect, the pneumatically inflated, flexible pillow bags have very little resistance to shear distortion and will not materially interfere with the oscillation of the inertial mass member 158 over the entire frequency spectrum that will customarily be used for seismographic purposes. At the same time, the shock absorber means 170, 172, 174 and 176 will transmit the downwardly directed static load and will also absorb any vertical components of vibration so as to effectively isolate the vibrations of the device 100 from the transporting vehicle. When the seismic "shot" is completed, the device 100 may again be lifted by the vehicle and be transported to the next shot location.

Figure 5:
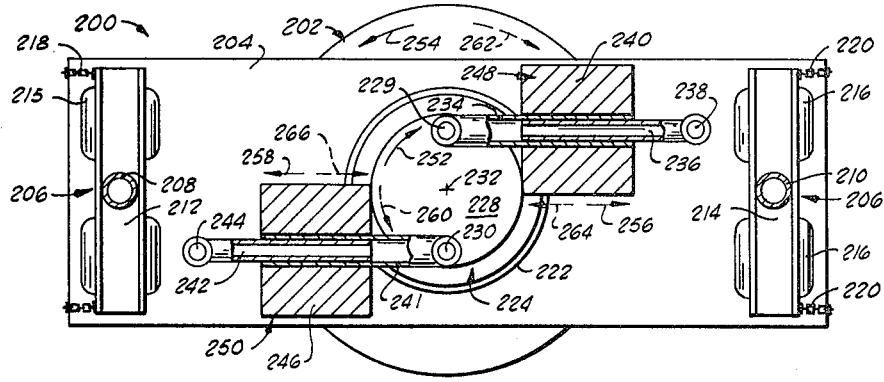
FIG. 5 is a plan view, partially in section, of still another device constructed in accordance with the present invention.

Referring now to FIG. 5, another device constructed in accordance with the present invention is indicated generally by the reference numeral 200. The device 200 is substantially identical to the device 10 previously described, except for the type of inertial mass member that it utilized. Thus the device 200 has an earth coupling member 202 and a horizontal support member 204, which are substantially identical to the earth coupling member 12 and the horizontal plate 28 of the device 10. A thrust bearing (not illustrated), corresponding to the thrust bearing 30 of the device 10, is provided between the earth coupling member 202 and the horizontal plate 204. A suitable transport means, indicated generally by the reference numeral 206 and which is identical to the transport means 60 of the device 10, is also provided and is comprised of a pair of upright members 208 and 210, a pair of horizontal members 212 and 214, two pairs of shock absorber means 215 and 216, and two pairs of tension members 218 and 220, all interconnected as previously described. The device 200 also includes a plate 222 corresponding to the plate 38 of the device 10 which overlaps the horizontal plate 204 and serves as a means to lift the earth coupling member 202.

The stator ring 224 of a D.C. wound electric motor, indicated generally by the reference numeral 226, is connected to the plate 222. The armature 228 of the electric motor 226 is disposed within the stator ring 224, as previously described, and the weight of the armature 228 is supported by any suitable bearing means (not illustrated). The motor 226 is also preferably of the so-called pancake type, as previously described, and is also driven by a synchronous A.C. power source (not illustrated) of the type previously described. Thus it will be appreciated that so much of the structure as has been described is substantially identical to the corresponding structure of the device 10.

However, the device 200 differs from the device 10 in that a pair of vertically disposed journal pins 229 and 230 are connected to the armature 228 at points spaced from its center of rotation, which coincides with the axis of oscillation 232 of the earth coupling member 202. A tubular rod 234 is pivotally connected to the journal pin 229 and is slidably telescoped over a rod 236 which is pivotally connected to a journal pin 238 secured on the horizontal plate 204. A mass block 240 is rigidly connected to the tubular member 234 and reciprocates with the tubular member, as will presently be described. Thus it will be noted that the rod 236 serves as a guide track for the mass block 240 and that the guide track is pivotally connected to the horizontal plate 204 to compensate for the rotary motion of the journal pin 229. A second tubular rod 241 is pivotally connected to the journal pin 230 and telescopically receives a second rod track 242 which is pivotally connected to a journal pin 244 which in turn is connected to the horizontal plate 204. A second mass block 246 is fixed around the tubular member 241 and reciprocates with the tubular member, as will presently be described. Although it will be evident to those skilled in the art that the armature 228 of the motor 226 will also function to a certain extent as an inertial mass member, the device 200 may be considered as having a first inertial mass member, indicated generally by the reference numeral 248, which is comprised of the mass block 240 and the tubular rod member 234, and a second inertial mass member 250 which is comprised of the mass block 246 and the tubular rod 241.

The operation of the device 200 is substantially identical to that of the device 10, except in the manner in which the inertial mass members 248 and 250 exert a reaction torque on the earth coupling member 202 as the electric motor 226 is oscillated. Thus assume that the electric motor 226 is momentarily energized by an A.C. power source to such a polarity as to cause the armature 228 to rotate clockwise in the direction of the solid arrow 252 about the axis of oscillation 232, and the stator ring 224 and therefore the earth coupling member 202 to which it is connected, to rotate counterclockwise in the direction of the arrow 254. The clockwise rotation of the armature 228 will be transmitted to the tubular arm member 234 and therefore to the inertial mass member 248 to displace the inertial mass member in the direction of the arrow 256. At the same time, the rotary motion of the armature 228 will be transmitted through the journal pin 230 to the inertial mass member 250 and will tend to displace the inertial mass member in the direction of the solid arrow 258. Of course, it will be evident that the inertial mass members 248 and 250 will resist this displacement and a resulting counterclockwise torque about the axis of oscillation 232 and in the direction of the solid arrow 254 will be applied to the earth coupling member 202.

When the power current to the motor 226 is reversed, the armature 228 will tend to rotate in the direction of the dotted arrow 260. As a result, the inertial mass members 248 and 250 will tend to be displaced in the directions of the dotted arrows 264 and 266, respectively, so that again a reaction torque will be applied through the armature 228 and stator ring 224 to the earth coupling member 202 in the direction of the dotted arrow 262. It will be noted that the inertial mass members 248 and 250 are reciprocated generally rectilinearly and are bearing supported on the track means 236 and 242 so as to substantially eliminate the transmission of torque to the horizontal plate 204. Further, the track means 236 and 242 are pivotally connected to the horizontal plate 204 and the tubular members 234 and 241 are pivotally connected to the armature 228 to accommodate for the slight arcuate swinging which will result from the circular path of the journal pins 229 and 230. However, it will be appreciated that if the members are aligned substantially as shown in FIG. 5 and the oscillatory stroke of the armature 228 is relatively short, as will nearly always be the case, there will be very little pivotal movement about the journal pins 229 and 238, or 230 and 244 during operation of the device, and accordingly virtually no torque will be transmitted to the horizontal plate 204. It will also be appreciated that since substantially no torque will be applied to the plate 204, the demand upon the shock absorbing means 215 and 216 to isolate the rotational motion of the plate 204 from the truck or other transporting vehicle will be substantially eliminated so that corresponding modifications in the construction of the shock absorbing means can be made if it is desirable to do so.

Figure 6:
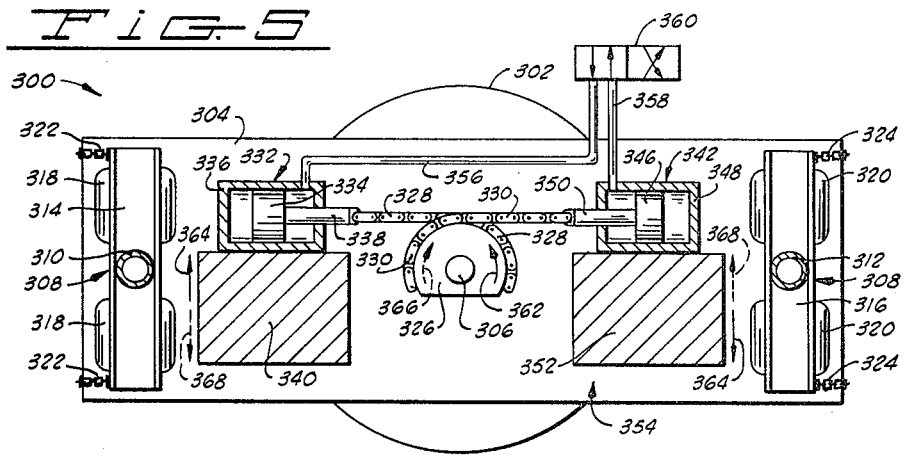
FIG. 6 is a plan view, partially in section, of yet another device constructed in accordance with the present invention.

Referring now to FIG. 6, another device constructed in accordance with the present invention is indicated generally by the reference numeral 300. The device 300 is quite similar to the device 100, except for the construction of the oscillating hydraulic motor means which will presently be described in detail. The device 300 includes an earth coupling member 302, which may be substantially identical to the earth coupling member 102. The earth coupling member 302 has a vertically disposed shaft 306, the upper end of which can be seen in FIG. 6, which extends through a horizontal plate 304 and is coincident with the axis of oscillation of the earth coupling member 302, as will hereafter be described in greater detail. A thrust bearing (not illustrated), substantially identical to the thrust bearing 112 of the device 100 may be provided between the earth coupling member 302 and the horizontal plate member 304 for transmitting the load of an inertial mass member presently to be described, and a static holddown load to the earth coupling member 302.

Suitable transport means, indicated generally by the reference numeral 308 may be substantially identical to the transport means 160 of the device 100 and may be connected to the outer ends of the horizontal plate 304 substantially as illustrated. The transport means 308 accordingly may comprise a pair of upright members 310 and 312, a pair of horizontally extending channel members 314 and 316, two pairs of shock absorbing means 318 and 320, and two pairs of tension members 322 and 324, all interconnected as previously described in connection with the device 100.

A sprocket means 326 is connected to the upper end of the vertically disposed shaft 306. A pair of flexible tension members 328 and 330 are operatively connected to the sprocket means 326 in such a manner as to apply oppositely directed torques to the sprocket means 326 and therefore to the shaft 306 and to the earth coupling member 302. The flexible tension members may conveniently comprise chains or cables and the sprocket means 326 may or may not be provided with teeth, depending upon the type of tension member employed. However, the ends of the tension members 328 and 330 are rigidly connected to the sprocket means 326 so as to prevent any free play between the two members.

A first, single-acting hydraulic linear actuator, indicated generally by the reference numeral 332, is comprised of a piston means 334 which is reciprocally disposed within a cylinder means 336. The piston means 334 includes a rod 338 which is connected to the tension member 328. The cylinder means 336 is connected to the plate 304 in any suitable manner. However, as illustrated, the cylinder means 336 may conveniently be connected to a mass block 340 which in turn is connected to the horizontal plate 304. A second, single-acting hydraulic linear actuator is indicated generally by the reference numeral 342 and comprises a piston means 346 which is reciprocally disposed in a cylinder means 348 and has a piston rod 350 which is connected to the other tension member 330. The cylinder means 348 is connected to a second mass block 352 which in turn is rigidly connected to the horizontal plate 304. Thus it will be appreciated that the horizontal plate 304, the mass blocks 340 and 352 and the cylinder means 336 and 348 are rigidly interconnected and comprise an inertial mass member which is indicated generally by the reference numeral 354. The various components of the inertial mass member 354 should be so arranged on the plate 304 as to be balanced about the centrally disposed shaft 306 of the earth coupling member 302. The hydraulic linear actuators 332 and 342 may be actuated by hydraulic fluid introduced through fluid ports 356 and 358, respectively, which are connected as illustrated. When in the position illustrated, a four-way hydraulic valve 360 directs power fluid from a suitable source (not illustrated) to the port 356 and will return fluid from the port 358 to a suitable supply sump (not illustrated). When shifted to the other position, the four-way valve 360 will direct fluid to the port 358 and will exhaust fluid from the port 356.

The operation of the device 300 is fundamentally identical to the operation of the device 100 insofar as the generation of seismic torsional waves is concerned. The device 300 can be raised and lowered by applying the appropriately directed forces to the upright members 310 and 312 as in the case of the device 100. Also, a static holddown load applied to the upright members 310 and 312 will be transmitted through the shock absorbing means 318 and 320 to the horizontal plate 304 of the inertial mass member 354, and then the static load and the weight of the inertial mass member 354 will be transmitted by the thrust bearing means (not illustrated) to the earth coupling member 302 in order to press the projections (not illustrated) on the coupling member into the earth as previously described.

When the four-way valve 360 is in the position illustrated, high pressure hydraulic power fluid will be directed through the port 356 and introduced to the cylinder means 336 of the first, single-acting hydraulic linear actuator 332. The piston means 334 will be moved to the left so as to exert a tension force on the tension member 338. At the same time, hydraulic fluid will be exhausted from the cylinder means 348 through the port 358, preferably at a controlled rate to prevent slack from accumulating in the tension member 330. The inertial mass member 354 will respond by tending to rotate in a clockwise direction as indicated by the solid arrows 364, and as previously described, this will result in a reaction torque being applied to the sprocket means 326, to the shaft 306, and finally to the earth coupling member 302 in the counterclockwise direction as indicated by the arrow 362.

When the valve 360 is shifted to the other position, hydraulic power fluid will be directed through the fluid port 358 to the cylinder means 348 of the single-acting linear actuator 342 and the piston means 346 will be moved to the right in FIG. 6 to exert a tension force on the tension member 330. At the same time, fluid will be exhausted from the cylinder means 336 by the port 356. The tension in the tension member 330 will result in a torque being applied to the inertial mass member 354 in the direction of the dotted arrow 368 and a reaction torque on the sprocket means 326, the shaft 306 and on the earth coupling member 302 in the direction of the dotted arrow 366. Thus it will be evident that as the alternating torques are applied to the earth coupling member 302 at a frequency corresponding to the rate at which the four-way valve 360 is shifted, a torsional wave will be generated in the earth having a corresponding frequency. The shock absorbing means 318 and 320 will isolate the oscillating motion of the horizontal plate 304, which is a part of the inertial mass member 354, from the upright members 310 and 312 and therefore from the transporting vehicle. The shock absorbing means 318 and 320 will also isolate vertical vibration components from the upright members 310 and 312, as previously described, while applying a downwardly directed static load to the inertial mass member 354 and subsequently to the earth coupling member 302.

Figure 7:
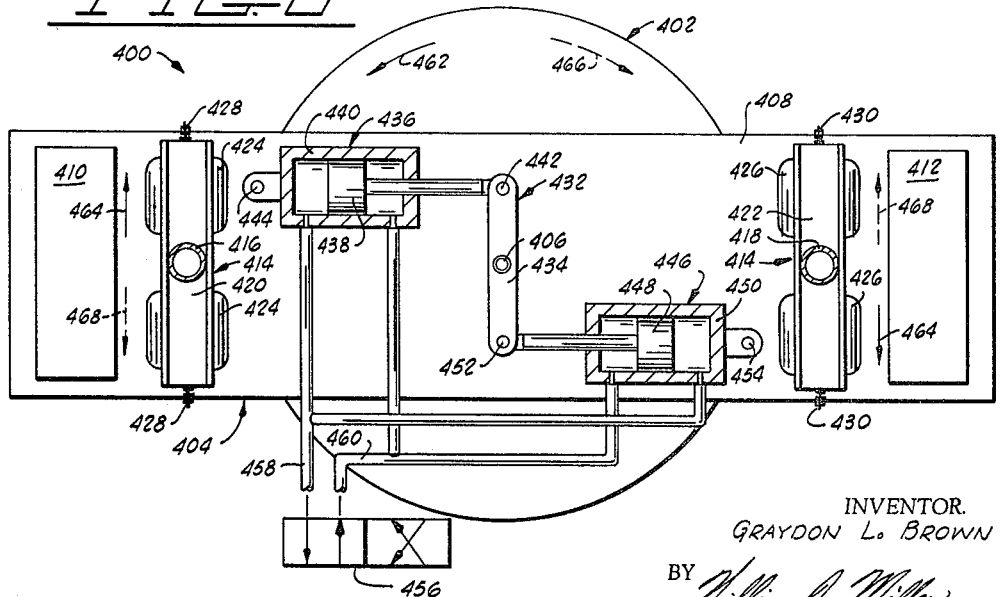
FIG. 7 is a plan view, partially in section, of another device constructed in accordance with the present invention.

Referring now to FIG. 7, another device constructed in accordance with the present invention is indicated generally by the reference numeral 400. The device 400 has an earth coupling member 402, which may be substantially identical with the earth coupling member 102 of the device 100, and an inertial mass member indicated generally by the reference numeral 404 which may be substantially identical with the inertial mass member 158 of the device 100. Further, a suitable thrust bearing (not illustrated), such as the thrust bearing 112 of the device 100, is operatively disposed around a vertically disposed shaft 406 of the earth coupling member 402 and between the earth coupling member 402 and the inertial mass member 404 for transmitting the weight of the inertial mass member and also a static holddown force applied, as hereafter described, through the inertial mass member 404 to the earth coupling member 402. The inertial mass member 404 is comprised primarily of a horizontally disposed plate 408 and two mass blocks 410 and 412 which are rigidly connected to the opposite ends of the horizontal plate 408.

A suitable transport means, indicated generally by the reference numeral 414, may be identical in construction to the transport means 160 of the device 100 and comprises upright members 416 and 418, horizontal channel members 420 and 422, two pairs of shock absorber means 424 and 426, and two pairs of tension members 428 and 430, all assembled in the manner of the transport means 160 of the device 100. It will be appreciated from the foregoing description that the shock absorber means 424 and 426 will isolate both horizontal and vertical components of motion of the plate 408 from the upright members 416 and 418 and therefore from a suitable transporting vehicle (not illustrated).

The device 400 differs from the device 100 primarily in the type of hydraulic oscillating motor means which is used to oscillate the inertial mass member 404 with respect to the earth coupling member 402 about a vertical axis of oscillation which, in the instant application, coincides with the shaft 406. The oscillating motor means for this purpose is indicated generally by the reference numeral 432 and is comprised of a bell crank 434 which is rigidly connected to the upper end of the shaft 406. A first, double-acting, hydraulic linear actuator, indicated generally by the reference numeral 436, is comprised of a piston means 438 which is reciprocally disposed within a cylinder means 440. The piston means 438 is pivotally connected to the end of the bell crank 434 by a suitable pin 442 and the cylinder means 440 is pivotally connected to the plate 408 by a journal pin 444. A second, double-acting, hydraulic linear actuator 446 is comprised of a piston means 448 which is reciprocally disposed within a cylinder means 450. The piston rod of the piston means 448 is pivotally connected to the other end of the bell crank 434 by a pin 452. The cylinder means 450 is pivotally connected to the horizontal plate 408 and therefore to the inertial mass member 404 by a journal pin 454. The linear actuators 436 and 446 are operated in synchronism by a single four-way hydraulic valve 456. A first hydraulic fluid port 458 is in fluid communication with the head ends of both the cylinder means 440 and 450. The other fluid port 460 is in fluid communication with the rod ends of both the cylinder means 440 and 450. Of course, the valve 456 is connected to a suitable source (not illustrated) of high pressure hydraulic fluid and to a return flow line to the fluid sump.

The fundamental operation of the device 400, insofar as the generation of torsional waves is concerned, is substantially identical to each of the devices heretofore described, and is particularly similar to the operation of the device 100. The device 400 may be transported by a vehicle to substantially any location where it is desired to generate a seismic torsional wave. The device 400 may then be lowered until the earth coupling member 402 engages the earth and a static holddown load then applied through the upright members 416 and 418, the shock absorber devices 424 and 426, the plate 408 of the inertial mass member 404, and through the thrust bearing (not illustrated) to the earth coupling member 402 in order to press the projections (not illustrated) into the surface of the earth, as previously described in connection with the device 100.

When the valve 456 is in the position illustrated, hydraulic power fluid will be directed through the fluid port 460 to the rod ends of the cylinder means 440 and 450 and fluid will be exhausted from the head ends of the cylinder means through the fluid port 458. The piston means 438 and 448 will then be moved outwardly toward the ends of the horizontal plate 408 and the bell crank 434, the piston rods of the piston means will be placed under tension, and the inertial mass member 404 will tend to rotate about the shaft 406 in a clockwise direction as indicated by the solid arrows 464. This will produce a reaction torque in the earth coupling member 402 in the counterclockwise direction as indicated by the solid arrow 462. When the valve 456 is shifted to the other position, power fluid will be directed through the port 458 to the head ends of the cylinder means 436 and 446 and fluid will be exhausted from the rod ends through the port 460. The piston means 438 and 448 will then be moved inwardly toward the center of the device and the piston rods will be placed under compression. As a result, the inertial mass member 404 will tend to rotate about the shaft 406 in a counterclockwise direction as indicated by the dotted arrows 468 and a reaction torque will be applied to the earth coupling member 402 in the clockwise direction about the shaft 406, as indicated by the dotted arrows 466. Thus it will be evident that by shifting the four-way valve 456 at a predetermined frequency, a periodically reversing torque can be applied to the earth coupling member 402 having the same frequency as the rate at which the valve 456 is shifted. It will also be evident that the inertial mass member 404 will be oscillated about the shaft 406 relative to the stationary upright members 416 and 418 of the transport means 414. However, the shock absorber means 424 and 426 will adequately isolate both the horizontal motion and vertical motion of the horizontal plate 408 from the upright members 416 and 418 and therefore from the transporting truck so long as the stroke of the bell crank 434 does not exceed the design limits.

Figure 9:
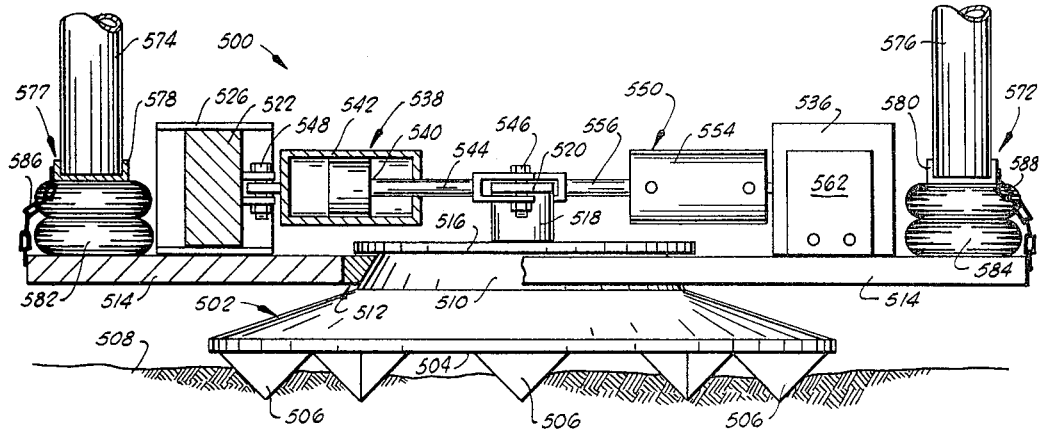
FIG. 9 is a sectional view taken substantially on lines 9—9 of FIG. 8.
Figure 8:
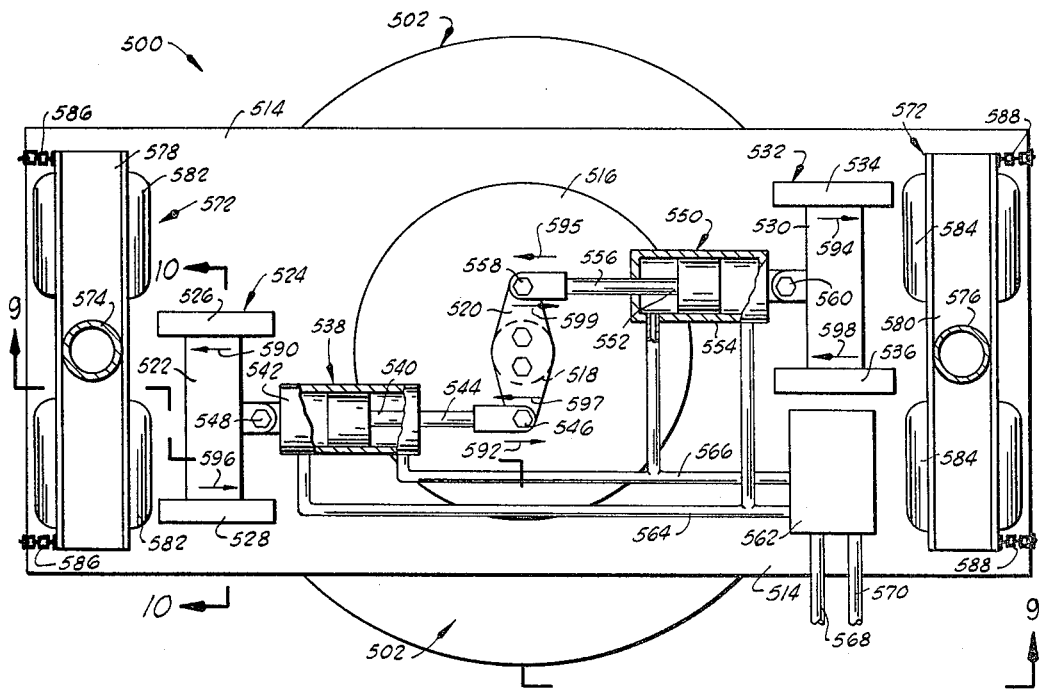
FIG. 8 is a plan view, partially in section, of yet another embodiment of the present invention.
Figure 10:
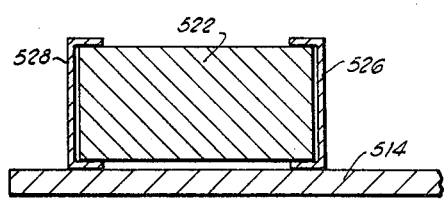
FIG. 10 is a sectional view taken substantially on lines 10—10 of FIG. 8.

Referring now to FIGS. 8, 9 and 10, another device constructed in accordance with the present invention is indicated generally by the reference numeral 500. The device 500 is comprised of an earth coupling member 502 having a generally planar bottom 504 from which a plurality of pyramidal-shaped projections 506 extend downwardly into the surface 508 of the earth, as previously described in connection with the device 10. The earth coupling member 502 has a centrally located, vertically disposed shaft portion 510 that is coincidental with the vertically disposed axis of oscillation of the earth coupling member, as will hereafter be described. The shaft portion 510 is provided with a shoulder, as illustrated in FIG. 9, to form one-half of a thrust bearing, indicated generally by the reference numeral 512, which is operatively disposed between the earth coupling member 502 and a horizontally disposed support plate 514 in such a manner as to transmit a downwardly directed load from the support plate 514 to the earth coupling member 502 as will hereafter be described in greater detail. A disc-shaped plate 516 is connected to the shaft portion 510 and extends outwardly over the thrust bearing 512 so as to provide a means for lifting the earth coupling member 502 when the plate 514 is raised.

A smaller, centrally located, vertically disposed shaft 518 is connected to the earth coupling member 502 and, like the shaft portion 510, is coincidental with the axis of oscillation of the earth coupling member 502. A bell crank 520 is connected to the upper end of the shaft 518. A first inertial mass member 522 is slidably received in a track means, indicated generally by the reference numeral 524, which may be comprised of a pair of facing channels 526 and 528, as best seen in FIG. 10, which are connected to the support plate 514. Thus it will be noted that the inertial mass member 522 is free to reciprocate linearly along a line which does not intersect the shaft 518, which coincides with the axis of oscillation of the earth coupling member 502. A second inertial mass member 530 is slidably received in a track means 532 comprised of facing channels 534 and 536 which are connected to the support plate 514. The second inertial mass member 530 is also free to reciprocate along a line that is offset from the shaft 518 and is preferably disposed parallel to the line of reciprocation of the first inertial mass member 522.

A first, double-acting hydraulic linear actuator, indicated generally by the reference numeral 538, is comprised of a piston means 540 which is reciprocally disposed within a cylinder means 542. The piston rod 544 of the piston means 540 is pivotally connected to one end of the bell crank 520 by a suitable pin 546, and the cylinder means 542 is pivotally connected by a suitable pin 548 to the inertial mass member 522. A second, double-acting linear actuator is indicated generally by the reference numeral 550 and is comprised of a piston means 552 which is reciprocally disposed within a cylinder means 554. The piston rod 556 of the piston means 552 is pivotally connected to the other end of the bell crank 520 by a suitable pin 558, and the cylinder means 554 is pivotally connected to the second inertial mass member 530 by a suitable pin 560. The hydraulic linear actuators 538 and 550 are operated in synchronism by a four-way hydraulic control valve 562 which alternately directs power fluid to a first port 564 while exhausting fluid from a second port 566, and then applies power fluid to the second port 566 while exhausting fluid from the first port 564. The port 564 is connected to the head ends of both of the cylinder means 542 and 554. The second fluid port 566 is connected to the rod ends of both of the cylinder means 542 and 554. Of course, the four-way valve 562 may be connected by a conduit 568 to a source of power fluid (not illustrated) and by a conduit 570 to a fluid sump (not illustrated), and may be operated by a suitable electrically controlled servo system (not illustrated).

A transport means, indicated generally by the reference numeral 572, is substantially identical to the transport means of the five embodiments heretofore described. The transport means 572 comprises a pair of upright members 574 and 576 which may be connected to suitable lift means (not illustrated) mounted on a transporting vehicle, for both raising and lowering the device 500 and for applying a static holddown load to the upright members 574 and 576 which will be transmitted to the earth coupling member 502, as will presently be described. A pair of horizontal channels 578 and 580 are connected to the lower ends of the upright members 574 and 576, respectively. Two pairs of shock absorber means 582 and 584 are disposed between the channels 578 and 580, respectively, and the opposite ends of the support plate 514. As previously described, the shock absorber means 582 and 584 may comprise pneumatically inflated, flexible pillow bags which may be vulcanized or otherwise bonded to each other, to the channels 578 and 580, and to the support plate 514. Two pairs of tension members 586 and 588 loosely interconnect the channels 578 and 580, respectively, and the corresponding ends of the support plate 514. The tension members may conveniently be short lengths of chain or other suitable flexible material.

In operation, the device 500 is of course transported to the site at which it is desired to generate seismic waves and the earth coupling member 502 is lowered into engagement with the surface 508 of the earth and a downwardly directed static load applied to the upright members 574 and 576. The static holddown load will be transmitted through the shock absorber means 582 and 584 to the support plate 514 and then through the thrust bearing 512 to the earth coupling member 502. Of course, the load of the remaining parts of the device which are connected to the support plate 514 will also be transmitted through the thrust bearing 412 to the earth coupling member.

When the four-way valve 562 is so positioned as to pass hydraulic power fluid from the conduit 568 to the port 564, high pressure power fluid will simultaneously be introduced to the head ends of the cylinder means 542 and 554. At the same time, fluid will be exhausted from the rod ends of the respective cylinder means through the port 566. The introduction of power fluid to the head ends of the cylinder means 542 will expel the piston means 552 from the cylinder means and an expansion force will be exerted between the pins 546 and 548 which will move the first inertial mass member 522 to the left as indicated by the arrow 590, and a reaction force will be applied to the bell crank 520 in the counterclockwise direction as indicated by the arrow 592. At the same time, the linear actuator 550 will exert a force on the inertial mass member 530 in the direction of the arrow 594 and a reaction force on the pivot pin 558 and therefore on the bell crank 520, in the counterclockwise direction as indicated by the arrow 595. Thus it will be evident that as the inertial mass members 522 and 530 are accelerated outwardly in the directions of the arrows 590 and 594, a reaction force will be applied to the bell crank 520 in the opposite direction which will apply a counterclockwise torque to the earth coupling member 502.

When the valve 562 is shifted so as to direct high pressure power fluid from the conduit 568 into the port 566, the power fluid will be introduced to the rod ends of the cylinder means 542 and 554. A force will then be exerted on the inertial mass member 522 in the direction of the arrow 596 and a reaction force on the bell crank 520 in the direction as indicated by the arrow 597. At the same time, a force will be exerted on the inertial mass member 530 in the direction of the arrow 598 and a reaction force will be exerted on the bell crank 520 in the direction of the arrow 599. Thus it will be seen that the combined clockwise forces represented by the arrows 597 and 599 will cause a clockwise torque to be applied to the bell crank 520 and therefore to the earth coupling member 502.

Thus it will be evident that as the valve 562 alternately switches power fluid between the ports 564 and 566, torque will be alternately applied to the earth coupling member 502 in the counterclockwise and clockwise directions, respectively, and a torsional shear wave will be induced in the earth having a corresponding frequency. Since the inertial mass members 522 and 530 are reciprocated linearly, virtually no torque will be applied to the support plate 514, particularly if the lines over which the inertial mass members 522 and 530 are reciprocated tangentially intersect the arcs of the pins 546 and 558, respectively, because the arc through which the bell crank oscillates will be very short during most operations. Thus it will be noted that the shock absorber means 582 and 584 are required primarily for absorbing vertical component vibrations and for transmitting the vertical static holddown load to the support member 514, and can be modified to this extent if desired.

Referring now to FIGS. 11 and 12, a device constructed in accordance with the present invention is indicated generally by the reference numeral 600. The device 600 is comprised of an earth coupling member 602 which may have a generally rectangular shape, as best seen in FIG. 11, and a relatively flat bottom surface 604, as best seen in FIG. 12. A plurality of pyramidal-shaped projections 606 for penetrating the surface 608 of the earth and connecting the earth coupling member to the earth extend downwardly from the bottom face 604.

A first, double-acting, hydraulic linear actuator is indicated generally by the reference numeral 610 and is comprised of a double rod piston means 612 which is reciprocally disposed within a double rod-end cylinder means 614. The piston rods 616 and 618 are rigidly fixed to upright supports 620 and 622, respectively, which are both rigidly fixed to the earth coupling member 602. The cylinder means 614 is disposed within and forms a part of a first inertial mass member which is indicated generally by the reference numeral 624. A second, double-acting hydraulic linear actuator is indicated generally by the reference numeral 626 and is comprised of a double-rod piston means 628 which is reciprocally disposed within a double rod-end cylinder means 630. The piston rods 632 and 634 of the piston member 628 are connected to upright supports 636 and 638 which are in turn rigidly fixed to the earth coupling member 602. The cylinder means 630 is connected to and forms a part of a second inertial mass member which is indicated generally by the reference numeral 640. Therefore the hydraulic linear actuator 610 may be considered as interconnecting the first inertial mass member 624 and the earth coupling member 602, and the second hydraulic linear actuator 626 may be considered as interconnecting the second inertial mass member 640 and the earth coupling member 602.

The hydraulic linear actuators 610 and 626 are synchronously operated by a four-way valve 644 which alternately directs power fluid from a conduit 642 to a first fluid port 646 which is connected by a branch 648 to a first end I of the cylinder means 614 of the linear actuator 610 and by a branch 650 to the first end I of the cylinder means 630 of the linear actuator 626, and to a second fluid port 656, which has branches 652 and 654 connected to the second ends II of the linear actuators 610 and 626, respectively. When the valve 644 is in the position illustrated, power fluid is directed to the port 646 and into the first ends I of the cylinder means 614 and 630, and fluid is exhausted from the second ends II through the port 656. When the hydraulic valve 644 is shifted to the position other than that illustrated in FIG. 11, hydraulic power fluid is directed from the conduit 642 through the port 656 and branches 652 and 654 to the second ends II of the cylinder means 614 and 630, and fluid is exhausted from the first ends I of the cylinder means through the branches 648 and 650 and the port 646 to the return flow conduit 658.

Suitable transport means, indicated generally by the reference numeral 660, may be substantially identical to the transport means of the previously described embodiments of the present invention. The transport means 660 comprises a pair of upright members 662 and 664 which may be connected to suitable lifting means (not illustrated) on a transporting truck which is also capable of applying a downwardly directed static load to the upright members. Horizontally extending channel members 666 and 668 are connected to the bottom of the upright members 662 and 664. A pair of shock absorber means 670 are disposed between the channel member 666 and the end of the earth coupling member 602 and a similar pair of shock absorber means 672 are disposed between the channel member 668 and the other end of the earth coupling member 602. As previously described, the shock absorber means 670 and 672 may conveniently be pneumatically inflated, flexible pillow bags which may be vulcanized or otherwise adhered to each other, to the channels and to the earth coupling member 602. A pair of tension members 674 interconnect the ends of the channel member 666 and the end of the earth coupling member 602 and a similar pair of tension members 676 interconnect the ends of the channel member 668 and the other end of the earth coupling member 602.

When it is desired to generate a torsional shear wave, the device 600 is lowered until the earth coupling member 602 engages the surface 608 of the earth. A downwardly directed static load is applied to the upright members 662 and 664 and is transmitted through the shock absorber means 670 and 672 directly to the earth coupling member 602. The static holddown load applied through the shock absorber means acts in concert with the weight of the inertial mass members 624 and 640, and of course the weight of the coupling member 602 itself, to force the projections 606 into the surface of the earth and securely connect the earth coupling member 602 to the earth.

Assuming that the four-way valve 644 is in the position illustrated in FIG. 11, hydraulic power fluid will be directed through the fluid port 646 and the branches 648 and 650 to the first ends I of the cylinder means 614 and 630. At the same time, fluid will be exhausted from the second ends II of the cylinder means through the branches 652 and 654 and the port 656. Therefore, the first inertial mass member 624 will be accelerated in the direction of the arrow 680 and the second inertial mass member 640 will be accelerated in the opposite direction illustrated by the arrow 682. The acceleration of the inertial mass 624 linearly along the piston means 612 will cause an oppositely directed reaction force on the piston means 612 which will be transmitted through the upright supports 620 and 622 to the earth coupling member 602 and produce a force acting upon the corresponding end of the earth coupling member 602 in the direction of the arrow 684. At the same time, the acceleration of the second inertial mass member 640 in the direction of the arrow 682 will cause a reaction force on the piston means 628 and therefore on the corresponding end of the earth coupling member 602 in the direction of the arrow 686. The two forces 684 and 686 combine to form a force couple which will exert a counterclockwise torque upon the earth coupling member 602, when referring to FIG. 11, about a vertically disposed axis of oscillation extending substantially through the geometric center of the earth coupling member 602.

When the valve 644 is shifted to the position other than that illustrated in FIG. 11, the hydraulic power fluid will be directed through the port 656 and its branches 652 and 654 to the second ends II of the cylinder means 614 and 630. At the same time, fluid will be exhausted from the first ends I of the cylinder means through the branches 648 and 650 and the port 646. Therefore, the first inertial mass member 624 will be accelerated in the direction indicated by the arrow 688 and the second inertial mass member 640 will be accelerated in the direction indicated by the arrow 690. The acceleration of the two inertial mass members 624 and 640 will generate reaction forces upon the respective piston means 612 and 628 and therefore upon the respective ends of the earth coupling member 602 in the opposite directions of the arrows 692 and 694, respectively, which will also form a force couple and apply a clockwise torque to the earth coupling member 602 about substantially the same vertical axis of oscillation. Thus it will be evident that merely by shifting the four-way valve 644 at a desired frequency rate, the inertial mass members 624 and 640 can be synchronously reciprocated in opposite directions so as to apply periodically reversing torques to the earth coupling member 602 so as to generate a seismic torsional wave in the earth, as previously described, having a frequency corresponding substantially to the frequency at which the valve 644 is shifted.

Referring now to FIGS. 13 and 14, another combination device constructed in accordance with the present invention is indicated generally by the reference numeral 700. The device 700 has a fundamental mode of operation which is closely related to that of the device 600, but provides a means whereby a seismic torsional wave of considerably higher energy level can be generated. The device 700 comprises the combination of one or more pairs of linear vibrators each indicated generally by the reference numeral 702. Although one pair of the devices 702 is illustrated, it is to be understood and will be appreciated by those skilled in the art that more than one pair can be used in order to increase the energy level of the torsional shear waves. It will be noted that each pair of the devices 702 comprises, in essence, the device 600 with the earth coupling member 602 split into a pair of earth coupling members. Each of the devices 702 may be constructed substantially identical to the device described in copending U.S. application Serial No. 237,661, which describes in detail the construction of a transducer for generating horizontal and vertical shear waves. However, for purposes of the present invention, the two devices must be used in combination in order to generate the desired torsional shear wave.

Therefore, the device 700 may be considered as comprising first and second earth coupling members 704 and 706 spaced on opposite sides of a vertically disposed axis 708. A first inertial mass member 710 forms the double rod-end cylinder means for a first, double-acting hydraulic linear actuator indicated generally by the reference numeral 712. The first linear actuator 712 has a double-rod piston member 714 which is reciprocally disposed in the cylinder means formed by the inertial mass member 710. The piston rods of the piston member 714 are connected to upright supports 716 and 718 which in turn are connected to the first earth coupling member 704. Therefore, the inertial mass member 710 may be considered as connected to the earth coupling member 704 by the hydraulic linear actuator 712. A first fluid port 720 provides fluid communication between a four-way valve 722 and a first end I of the cylinder means formed by the inertial mass member 710. A second fluid port 724 provides communication between the valve 722 and the second end II of the cylinder means formed by the inertial mass member 710. A source of power fluid represented by the conduit 726 directs high pressure power fluid from a suitable source (not illustrated) to the valve 722 and a conduit 728 returns fluid from the valve 722 to a sump (not illustrated). Thus when the valve 722 is in the position illustrated, high pressure power fluid is directed to the first end I of the cylinder means and fluid is exhausted from the second end II of the cylinder means. When the valve 722 is shifted to the position other than that illustrated, high pressure power fluid is directed to the second end II of the cylinder means and fluid is exhausted from the first end I. The valve 722 is shifted from one position to the other by a suitable electrically controlled servo mechanism, represented schematically by the reference numeral 730, which will hereafter be described in greater detail.

A second inertial mass member 732 forms the double rod-end cylinder means of a second hydraulic linear actuator 734 which may be considered as interconnecting the inertial mass member and the second earth coupling member 706. The hydraulic linear actuator 734 has a double-rod piston means 736 which is reciprocally disposed in the cylinder means. The piston rods of the piston means 736 are connected by upright supports 738 and 740 to the earth coupling member 706. A four-way valve 742 alternately directs power fluid from a conduit 744 through a first port 746 to the first end I of the cylinder means formed by the inertial mass member 732 and through a second port 748 to the second end II of the cylinder means. The valve 742 at the same time exhausts fluid from the other end of the cylinder means to a return flow conduit 750. The valve 742 is shifted by an electrically actuated servo mechanism 752 and is operated in synchronism with the valve 722 by the same electrical control signal. The electrical control signal may be applied simultaneously to the servo mechanisms 730 and 752 by a common electrical conductor, as might be the case if both of the devices 702 are transported by a single vehicle, or the two servo mechanisms 730 and 752 may be actuated by a common radio signal received by separate radio receivers associated with each of the servo mechanisms 730 and 752.

Although the pair of devices 702 could be transported by a single vehicle and lowered into engagement with the surface of the earth in the necessary spaced relationship, it is preferred that each of the devices 702 be transported by a separate vehicle. Therefore, suitable transport means 760 are connected to each end of the earth coupling member 704. The transport means 760 may be identical to the transport means 660 of the device 600 and comprises a pair of upright members 762 and 764 connected to the ends of the earth coupling member 704 by suitable shock absorber means 766 and 768, respectively, and by suitable tension means (not illustrated) such as the tension means 674 and 676 of the device 600. The upright members 762 and 764 may be connected to a pair of hydraulic lifts 770 (only one illustrated) which may be connected to the rear of a transporting truck 772. The hydraulic motor 770 should be capable of exerting either an upward force on the upright members 762 and 764 in order to raise the device 702 from the surface of the earth, or a downwardly directed force on the upright members to apply a portion of the weight of the truck to the earth coupling member 704 as a static load. The second earth coupling member 706 is connected by identical transport means, indicated generally by the reference numeral 784, to identical hydraulic motors 786 of a second truck 788.

The operation of the device 700 is substantially identical to the operation of the device 600. By shifting the valves 722 and 742 in synchronism, the inertial mass members 710 and 732 may be reciprocated in synchronism, and always in opposite directions, along the generally parallel lines formed by the piston means 714 and 736 respectively. Each time that the inertial mass member 710 is reciprocated in one direction, a reaction force will be exerted upon the respective earth coupling member and therefore upon the surface of the earth in the other direction. At the same time, the other inertial mass member will be accelerated in the opposite direction and a reaction force will be exerted upon the other earth coupling member and therefore upon the surface of the earth in the other direction. The oppositely directed, spaced, parallel forces applied to the earth will then act as a force couple and exert a torque on the earth acting about the vertically disposed axis 708. When the direction of the inertial mass members 710 and 732 is reversed, the directions of the reaction forces applied to the earth will also be reversed and therefore the direction of the torque acting around the axis 708 will also be reversed. As a result, a torsional wave will be generated in the earth having a frequency content corresponding to the rate at which the torques are reversed, which will correspond to the rate at which the four-way valves 722 and 742 are shifted which in turn corresponds to the frequency of the synchronizing control signal.

It will be evident to those skilled in the art that the quantity of seismic energy which can be generated by any of the devices heretofore described in the lower frequencies is limited by the total inertial mass and the power of the actuating motor means. In other words, the greater the reaction mass, the more low frequency energy that can be generated for the same angular stroke of the reaction mass. Since the devices must be transported from one location to another, the total weight and size which a particular vehicle can transport is to a large degree the limiting factor in determining the maximum low frequency energy which can be induced in the earth. Therefore, it will readily be appreciated that by using a pair of the devices 702 and transporting each on a separate truck, each of the devices 702 can be made approximately as large as the device 600, and in fact the inertial mass member 710, for example, can be made larger than the combined weights of the inertial mass members 624 and 640 of the device 600. Thus, assuming both devices to be of maximum practical sizes, it will be evident that low frequency torsional waves having considerably greater energy levels can be generated by the device 700 than can be generated by a single device 600. But even more importantly, preliminary tests indicate that a plurality of pairs of the devices 702 can be operated in synchronism to generate torsional waves having a very high energy level. For example, two pairs of the devices 702 could be arranged in a quadrangular fashion around the vertical axis 708, three pairs could be arranged in a hexagonal configuration, or four pairs could be arranged in an octagonal configuration. Further, odd numbers of the devices 702 can be used if the devices are arranged in a somewhat uniform pattern about the axis 708, as will hereafter be described in greater detail. In every case if the devices are constructed identically and the vehicles backed into the configuration, in the manner illustrated in FIG. 14, for example, and all of the devices operated in synchronism by a common control signal, the inertial mass members will all be reciprocated in the proper direction at the proper time.

It will be evident that the inventive concept entailed in the construction and utilization of the devices of FIG.

13 discloses a novel and highly useful method of generating torsional shear waves having a high energy level and a controlled frequency content. The method may be summarily described as coupling a plurality of earth coupling members to the earth at spaced points around a circle and reciprocating the members in synchronism in opposite directions along lines tangent to the circle. Although two members are illustrated, more than two earth coupling members can be placed around the axis of oscillation if properly oriented. For best results, the earth coupling members should be placed in a circle around the axis 708 and should be generally equally spaced from each other around the circumference of the circle. Then if the earth coupling members are reciprocated along lines disposed generally tangent to the circle, and are synchronously reciprocated so as to move in the same circumferential direction at all times, it will be evident that the several earth coupling members will exert a periodically reversing torque on the earth acting about the center of the circle and will generate a torsional shear wave having a high energy level and a controlled frequency content.

Figure 15:
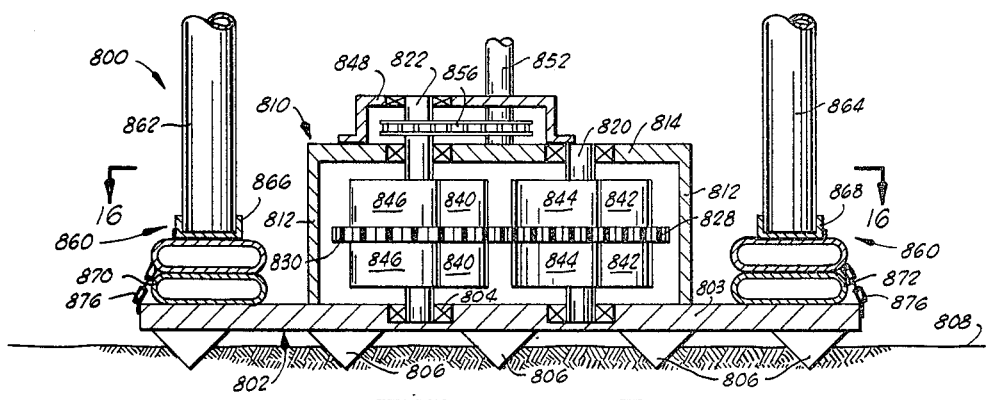
FIG. 15 is an elevational view in section of another device constructed in accordance with the present invention and is taken substantially on lines 15—15 of FIG. 16.
Figure 16:
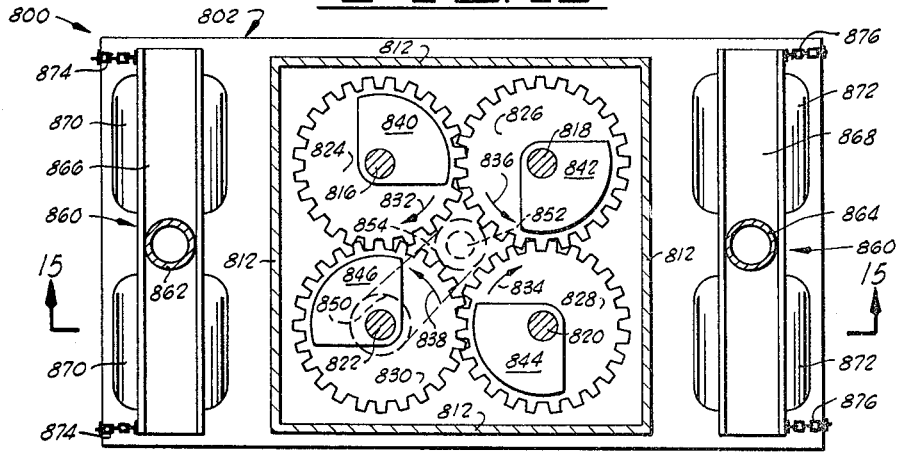
FIG. 16 is a plan view in section taken substantially on lines 16—16 of FIG. 15; and, FIGS. 17(a)-17(d) are schematic drawings illustrating the operation of the device described in FIGS. 15 and 16.

Referring now to FIGS. 15 and 16, another device constructed in accordance with the present invention is indicated generally by the reference numeral 800. The device 800 is comprised of an earth coupling member 802 which is comprised of a rectangular plate 803 having a generally planar undersurface 804 from which a plurality of pyramidal-shaped projections 806 extend downwardly and penetrate the surface 808 of the earth when the device is disposed in operative position, as will hereafter be described in greater detail. The earth coupling member includes a housing 810 having vertically disposed side walls 812 and a top wall 814.

Four vertically disposed axles 816, 818, 820 and 822 are rotatably journaled in the rectangular plate 803 and the top wall 814 of the housing 810 by suitable bearing means, substantially as illustrated in FIG. 15. Four intermeshing gears 824, 826, 828 and 830 are connected to the axles 816, 818, 820 and 822, respectively. The four gears all intermesh as illustrated in FIG. 16, so that the opposite pair of gears 824 and 828 are counter-rotating in the direction of the arrows 832 and 834, and the other opposite pair of gears 826 and 830 are counter-rotating in the direction of the arrows 836 and 838. Four eccentric inertial mass members 840, 842, 844 and 846 are respectively connected to the axles 816, 818, 820 and 822. The four inertial masses are each eccentrically connected to the axles in such a manner that opposite pairs are always eccentrically offset in opposite directions from the respective axles. Thus it will be noted that the eccentric inertial mass member 840 is eccentrically offset from the axle 816 in a direction that is opposite from the direction the eccentric inertial mass member 844 is offset from the axle 820, and that the eccentric inertial mass member 842 is offset from the axle 818 in a direction opposite to the direction the eccentric inertial mass member 846 is offset from the axle 822. Further, as will be evident in FIG. 16, the four eccentric inertial mass members are all offset in different directions from the respective axles at all times. The gears are of the same size and have the same number of teeth so that the four eccentric inertial mass members will be rotated in synchronism and will always maintain the desired relationship, as will hereafter become more evident.

The axle 822 extends upwards through the top wall 814 and may be journaled in the top wall of a second housing 848. A chain sprocket 850, shown only in dotted outline in FIG. 16, is fixed to the axle 822. A drive shaft 852 is positioned in the geometric center of the four axles 816, 818, 820 and 822 so as to be aligned with the axis of oscillation of the device, which will presently be described, and is also provided with a chain sprocket 854 which is shown only in dotted outline in FIG. 16. A chain 856 passes around the two chain sprockets 850 and 854. The drive shaft 852 extends upwardly to a suitable source of rotary power (not illustrated) which is preferably carried by the transporting vehicle and which may comprise any suitable prime mover and drive train.

A suitable transport means, indicated generally by the reference numeral 860 may be substantially identical to the transport means of the devices heretofore described and comprises a pair of upright members 862 and 864. A pair of horizontally disposed channel members 866 and 868 are connected to the bottoms of the upright members 862 and 864, respectively. A pair of shock absorber means 870 is positioned between the horizontal channel member 866 and the left-hand end of the earth coupling member 802 and a second pair of shock absorber means 872 is disposed between the horizontal channel member 868 and the right-hand end of the earth coupling member 802. As can best be seen in FIG. 15, each of the shock absorber means 870 and 872 may be comprised of two pneumatically inflated, resilient pillow bags which may be vulcanized to each other and to the channel members and the earth coupling member. A pair of tension members 874 loosely interconnect the ends of the horizontal channel member 866 and the earth coupling member 802 and a similar pair of tension members 876 loosely interconnect the ends of the other horizontal channel member 868 and the earth coupling member 802. Thus when an upward force is applied to the upright members 862 and 864, the tension members 874 and 876 will lift the earth coupling member 802 and the remainder of the structure connected thereto. When the earth coupling member 802 is lowered into contact with the earth and a load applied to the upright members 862 and 864, the shock absorber means 870 and 872 will transmit the downwardly directed static load to the earth coupling member 802 and yet will permit horizontal motion of the earth coupling member and will also absorb vertical components of vibratory motion.

In operation, the device 800 is of course transported to the desired location and merely lowered until the earth coupling member 802 contacts the earth. A static holddown load is then applied through the upright members 862 and 864 and through the shock absorber means 870 and 872 to the earth coupling member 802 to press the projections 806 into the surface 808 of the earth. The shaft 852 is then driven in such a manner as to rotate the four intermeshing gears in the directions of the arrows 832, 834, 836, and 838. Of course, as the eccentric inertial mass members are rotated, each will exert a centrifugal force on the respective axle in a direction extending from the axle through the center of gravity of the inertial mass member. Thus the inertial mass member 840 will exert a force on the axle 816 in the direction of the arrow 880, the inertial mass member 844 will exert a force on the axle 820 in the direction of the arrow 882, the inertial mass member 842 will exert a force on the axle 818 in the direction of the arrow 884, and the inertial mass member 846 will exert a force on the axle 822 in the direction of the arrow 886.

Figures 17A, 17B, 17C:
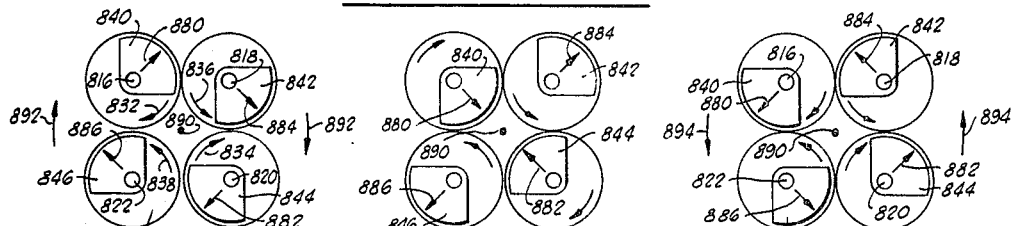

Therefore, when the inertial mass members are in the positions illustrated in FIG. 17(a), it will be noted that the oppositely directed forces 880 and 882 will form a force couple acting about a vertical axis 890 centered between the axles 816 and 820. In the same manner, the oppositely directed forces 884 and 886 of the inertial mass members 842 and 846 will form a force couple acting about the same vertical axis 890 and in the same direction as the force couple of the inertial mass members 840 and 844. Since the axles 816, 818, 820 and 822 are all connected to the earth coupling member 802, it will be evident that the force couples will both be applied to and exert a torque on the earth coupling member 802 tending to rotate the earth coupling member in the clockwise direction about the vertical axis 890 as indicated by the arrows 892.

When each of the intermeshing gears has been rotated one-quarter turn, the respective inertial mass members 840, 842, 844 and 846 will be in the positions illustrated in FIG. 17(b). Then it will be evident that the forces 880 and 882 will be exerted in opposite directions along the same line of force and will not exert a torque about the central vertical axis 890. The other pair of forces 884 and 886 generated by the inertial mass members 842 and 846 will also be exerted in opposite directions along a common line of force and will also cancel.

When each of the intermeshing gears has rotated still another quarter turn, the four inertial mass members 840, 842, 844 and 846 will be in the positions illustrated in FIG. 17(c). The forces 880 and 882 will again be oppositely directed normal to a line extending between the two axles 816 and 820 and will form a force couple about the central axis 890 which will act in the counterclockwise direction. The forces 884 and 886 of the other pair of eccentric inertial mass members 842 and 846 will also act in opposite directions normal to a line extending between the axles 818 and 822 and accordingly will form a force couple about the central axis 890 and will also act in the counterclockwise direction. Therefore, a counterclockwise torque in the direction of the arrows 894 will be applied to the earth coupling member 802.

Figure 17D:
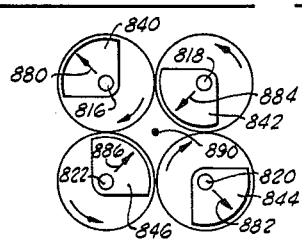

When the four gears have progressed another quarter turn from the positions shown in FIG. 17(c) to the positions shown in FIG. 17(d), it will be noted that the forces 880 and 882 will again be exerted in opposite directions along a single line of force extending through the two axles 816 and 820 and the axis 890, so that no torque will be exerted on the earth coupling member 802. Similarly, the forces 884 and 886 will be exerted toward each other along a common line of force extending through the axles 818 and 822 and through the center axis 890 and will exert no torque on the earth coupling member 802.

Therefore, it will be seen that as the four eccentric inertial mass members are rotated by the motor means comprised of the various axles and gears, a clockwise torque will be exerted in the directions of the arrows 892 when the eccentric inertial mass members are in the positions illustrated in FIG. 17(a). This torque will decrease sinusoidally as the inertial mass members continue to rotate and will become zero when the mass members are in the positions illustrated in the FIG. 17(b). Then as the mass members continue to rotate from the positions of FIG. 17(b), a counterclockwise torque in the direction of the arrows 894 will be exerted on the earth coupling member 802, and will increase in magnitude substantially sinusoidally to a peak torque when the inertial mass members are in the positions illustrated in FIG. 17(c). The counterclockwise torque will then decrease approximately sinusoidally as the inertial mass members are rotated from the positions illustrated in FIG. 17(c) to the positions illustrated in FIG. 17(d), at which time the torque will again be reversed to the clockwise direction and will increase in magnitude as the inertial mass members continue to rotate to the positions of FIG. 17(a). Thus it will be evident that a periodically reversing torque will be applied to the earth coupling member as the eccentric inertial mass members are rotated and the frequency of the reversing torque will be equal to the speed of rotation of the mass members. Of course, the periodically reversing torque applied to the earth coupling member will be transmitted to the surface of the earth and will result in the generation of seismic shear waves having a corresponding frequency content, as previously described.

As the periodically reversing torque is applied to the earth coupling member 802, the shock absorber means 870 and 872 of the transport means 860 will isolate both the horizontal motion and the vertical motion from the upright members 862 and 864 and therefore from the transporting truck. This is possible because when the static holddown load is applied to the shock absorber means, the inflated pillow bags will be depressed and the tension members 874 and 876 will become relatively loose. Since the drive shaft 852 is aligned with the central axis 890 about which the earth coupling member 802 is oscillated, it will be appreciated that the oscillation of the earth coupling member will not result in displacement of the drive shaft 852. It will also be noted that the device 800 is quite similar in fundamental operation to the devices 600 and 700 previously described because the component motion of the opposite pairs of inertial mass members, for example the inertial mass members 840 and 844, that actually produces the periodically reversing torque is rectilinear along parallel lines spaced on either side of the axis of oscillation 890. Thus the axles 816 and 820 together with the gears connected thereto may be considered as motor means which interconnect the eccentric inertial mass members 840 and the earth coupling member 802 and synchronously reciprocate the inertial mass members in opposite directions along parallel paths disposed on opposite sides of the axis of oscillation.

From the foregoing specification it will be evident that several highly useful devices for inducing seismic torsional waves in the earth or other similar elastic medium have been described. Each of the devices is capable of generating torsional shear waves of sufficient energy level as to be useful in seismographic surveying and more importantly, each of the devices is capable of generating seismic torsional waves having a controlled frequency content extending over a prolonged duration of time. Each of the devices can be easily transported from one locality to the next and can be connected to the earth for operation in a matter of seconds. This is extremely important when a large number of seismic "shots" are to be made, as will nearly always be the case in field operations.

Although several preferred embodiments of the present invention have been described in detail, it is to be understood that various changes, substitutions, alterations and interchange of components and parts can be made in the several embodiments without departing from the spirit and scope of the invention as defined by the appended claims. What is claimed is:

1. A device for inducing seismic torsional waves having a controlled frequency of prolonged duration in the earth, the device comprising:
at least one earth coupling member for engaging the earth;
at least one inertial mass member;
motor means connected to each of the earth coupling members and at least one inertial mass member for applying a periodically reversing torque to the earth coupling members for oscillating the earth coupling members about a vertically disposed axis;
transport means for lifting the members from the ground and for pressing the coupling member against the group with a holddown force;
at least one thrust bearing means operatively disposed between the transport means and one of the members for transmitting the holddown force to the earth coupling member while permitting oscillation of the earth coupling member relative to the transport means; and,
tension means interconnecting the transport means and at least one of the members,
whereby the device can be raised and transported by a truck or the like and can be lowered until the earth coupling member engages the ground and then a holddown force can be applied to the earth coupling member as the earth coupling member is oscillated about the vertical axis.

2. A device for inducing seismic torsional waves having a controlled frequency of prolonged duration in the earth, as defined in claim 1 wherein:
there is one earth coupling member and one inertial mass;
the motor means is a rotary-type oscillating motor; and,
the inertial mass is oscillated about the same vertically disposed axis as the coupling member.

3. A device for inducing seismic torsional waves having a controlled frequency of prolonged duration in the earth, as defined in claim 2 wherein:
the rotary-type oscillating motor comprises an electric motor having an armature member and a coil member; and,
one of the motor members is connected to the coupling member and the other is connected to the inertial mass.

4. A device for inducing seismic torsional waves having a controlled frequency of prolonged duration in the earth, as defined in claim 3 wherein:
the motor means comprises a reversible D.C. electric motor having an armature member, a coil member and an alternating current electric power source; and,
one of the motor members is connected to the earth coupling member and the other motor member is connected to the inertial mass,
whereby the D.C. electric motor will produce a reversing torque in synchronism with the alternations in the current from the power source.

5. A device for inducing seismic torsional waves having a controlled frequency of prolonged duration in the earth, as defined in claim 2 wherein:
the rotary-type oscillating motor is a hydraulic motor having a stator housing member and a vane-type rotor member; and,
one of the motor members is connected to the earth coupling member and the other of the motor members is connected to the inertial mass member.

6. A device for inducing seismic torsional waves having a controlled frequency of prolonged duration in the earth, as defined in claim 1 wherein:
the motor means is comprised of at least one hydraulic linear actuator having piston members reciprocally disposed in a cylinder member; and,
one of the motor members is pivotally connected to the earth coupling member at a point spaced from the vertically disposed axis and the other of the motor members is pivotally connected to the inertial mass member at a point spaced from the vertically disposed axis.

7. A device for inducing seismic torsional waves having a controlled frequency of prolonged duration in the earth as defined in claim 1 wherein the motor means is comprised of:
sprocket means connected to the earth coupling member and disposed about the vertically disposed axis;
at least one pair of flexible tension members operatively connected to the sprocket means for exerting oppositely acting torques on the sprocket means; and,
a corresponding number of pairs of hydraulic linear actuators each having a piston member reciprocally disposed in a cylinder member, one of the motor members of each linear actuator being connected to one of the tension members and the other motor member of each linear actuator being connected to the inertial mass member,
whereby the linear actuators may be alternately actuated to apply alternately directed torques to the earth coupling member.

8. A device for inducing seismic torsional waves having a controlled frequency of prolonged duration in the earth, as defined in claim 1 wherein:
there is one coupling member;
the motor means interconnecting the coupling member and each of the inertial masses is comprised of a hydraulic linear actuator having a piston member and a cylinder member;
one of the actuator members is connected to a point on the earth coupling member offset from the vertically disposed axis;
the other of the actuator members is connected to an inertial mass; and,
the inertial mass is reciprocated linearly.

9. A device for inducing seismic torsional waves having a controlled frequency of prolonged duration in the earth as defined in claim 1 wherein:
there are at least two inertial mass members;
each of the inertial mass members is connected to a coupling member at a point spaced from the vertically disposed axis; and,
the motor means imparts to each of the inertial mass members a reciprocating component of motion in a direction generally normal to a radial line extending from the vertically disposed axis, the inertial mass members being reciprocated in synchronism such as to have a circular component of motion in the same direction around the vertically disposed axis at all times.

10. A device for inducing seismic torsional waves having a controlled frequency of prolonged duration in the earth as defined in claim 9 wherein:
the motor means is comprised of a hydraulic linear actuator having a piston member and a cylinder member for each inertial mass member, one of the actuator members of each actuator being pivotally connected to a point on the earth coupling member spaced from the vertically disposed axis and the other of the actuator members being connected to one of the inertial mass members.

11. A device for inducing seismic torsional waves having a controlled frequency of prolonged duration in the earth as defined in claim 9 wherein:
the motor means for connecting each of the inertial mass members comprises a hydraulic linear actuator; and,
the motor means comprises a double-acting hydraulic linear actuator for each inertial mass member, each linear actuator comprising a piston member and a cylinder member, one of the actuator members of each actuator being rigidly fixed to the earth coupling member at a point spaced from the vertically disposed axis, and the other of the actuator members being connected to an inertial mass.

12. A device for inducing seismic torsional waves having a controlled frequency of prolonged duration in the earth, the device comprising:
an earth coupling member for engaging the earth;
an inertial mass member;
a rotary-type oscillating motor means interconnecting the earth coupling member and the inertial mass member for exerting an alternately directed torque between the two members about a vertically disposed axis;
whereby as the motor means exerts a torque on the inertial mass member in each direction of rotation about the vertical axis, a reaction torque will be exerted on the coupling member in the other direction about the vertical axis;
and transport means operatively connected to one of the members for lifting the members from the earth for transport and for lowering the coupling member into contact with the surface of the earth and applying a downwardly directed holddown force, the transport means having at least one thrust bearing means for permitting rotational motion of the member to which the transport means is connected about the vertically disposed axis and relative to the transport means.

13. A device for inducing seismic torsional waves having a controlled frequency of prolonged duration in the earth as defined in claim 12 wherein:
the motor means comprises a D.C. wound electric motor having a stator member and a rotor member and an A.C. source of electrical power operatively connected to the electric motor, whereby the electric motor will reverse directions in synchronism with the current reversals of the source of electrical power.

14. A device for inducing seismic torsional waves having a controlled frequency of prolonged duration in the earth as defined in claim 12 wherein:
the rotary-type oscillating motor means interconnecting the earth coupling member and the inertial mass member comprises a hydraulic vane-type oscillating motor having an oscillator vane and a stator housing, the oscillator vane being connected to one of the members and the stator housing being connected to the other.

15. A device for inducing seismic torsional waves having a controlled frequency of prolonged duration in the earth as defined in claim 12 wherein:
the rotary-type oscillating motor means interconnecting the earth coupling member and the inertial mass member comprises at least one double-acting hydraulic linear actuator having a piston means and a cylinder means, the piston means being pivotally connected to one of the members and the cylinder means being pivotally connected to the other member.

16. A device for inducing seismic torsional waves having a controlled frequency of prolonged duration in the earth as defined in claim 12 wherein:
the rotary-type oscillating motor means interconnecting the earth coupling member and the inertial mass member comprises sprocket means connected to the earth coupling member and disposed about the vertically disposed axis, a pair of tension members operatively connected to the sprocket means for exerting oppositely directed torques on the sprocket means and on the earth coupling member, and a pair of hydraulic linear actuators each having a piston means and a cylinder means, one of the means of each actuator being connected to one of the tension members and the other means of each actuator being connected to the inertial mass member.

17. A device for inducing seismic torsional waves having a controlled frequency of prolonged duration in the earth as defined in claim 12 further characterized by:
circular thrust bearing means operatively disposed between the earth coupling member and the inertial mass member for applying a downwardly directed force on the earth coupling member while permitting rotational movement between the earth coupling member and the inertial mass member about the vertically disposed axis.

18. A device for inducing seismic torsional waves having a controlled frequency of prolonged duration in the earth as defined in claim 12 wherein:
the thrust bearing means is operatively disposed between the transport means and the earth coupling member.

19. A device for inducing seismic torsional waves having a controlled frequency of prolonged duration in the earth as defined in claim 18 wherein:
the thrust bearing means is a circular bearing and the transport means also has shock absorber means for absorbing vertical vibrations.

20. A device for inducing seismic torsional waves having a controlled frequency of prolonged duration in the earth, the device comprising:
an earth coupling member for engaging the surface of the earth having a vertically disposed axis of ocillation;
an inertial mass member;
a D.C. wound electric motor comprising a stator ring connected to the coupling member and centered around the axis of oscillation, an armature disposed within the stator ring and connected to the inertial mass member, and an A.C. source of electric power;
a circular thrust bearing operatively disposed between the inertial mass member and the stator ring for transmitting the weight of the inertial mass member to the earth coupling member; and
transport means comprising a horizontally disposed plate member disposed around a portion of the earth coupling member, a circular thrust bearing operatively disposed between the plate member and the coupling member for transmitting a downwardly directed force from the plate member to the earth coupling member, means operatively interconnecting the plate member and the earth coupling member for exerting an upwardly directed force on the earth coupling member for lifting the earth coupling member and the inertial mass member, a pair of upright members disposed on either side of the inertial mass member for connection means for raising and lowering the device and for applying a downwardly directed force thereto, shock absorber means operatively disposed between each of the upright members and the plate member for absorbing vertical shock components while transmitting a downwardly directed force from the upright members to the plate member, and tension means interconnecting each of the upright members and the plate member for raising the plate member, the earth coupling member, the motor and the inertial mass member for transport.

21. A device for inducing seismic torsional waves having a controlled frequency of prolonged duration in the earth, the device comprising:
an earth coupling member for engaging the surface of the earth having a vertically disposed axis of oscillation;
an inertial mass member;
a hydraulic motor having a vertically disposed stator housing connected to the inertial mass member and disposed around the axis of oscillation, a vane-type rotor member operatively disposed within the stator housing for oscillatory motion about the axis of oscillation and connected to the earth coupling member, and means for directing fluid under pressure into the stator housing for oscillating the rotor member;
circular thrust bearing means operatively disposed about the axis of oscillation and between the inertial mass member and the earth coupling member for transmitting a downwardly directed force from the inertial mass member to the earth coupling member; and,
transport means comprising an upright member disposed on either side of the axis of oscillation, inflated pillow bag means operatively disposed between each of the upright members and the inertial mass member for transmitting a downwardly directed force from the upright member to the inertial mass member while permitting oscillatory motion of the inertial mass member about the axis of oscillation and absorbing vertical vibration components, and tension means interconnecting each of the upright members and the inertial mass member for lifting the inertial mass member and the earth coupling member for transport.

22. A device for inducing seismic torsional waves having a controlled frequency of prolonged duration in the earth, the device comprising:
an inertial mass member;
an earth coupling member for engaging the surface of the earth disposed below the inertial mass member and having a vertically disposed shaft extending through the inertial mass member which serves as an axis of oscillation, a thrust bearing operatively disposed around the shaft and between the inertial mass member and the earth coupling member for transmitting a downwardly directed force from the inertial mass member to the earth coupling member, and a bell crank connected to the upper end of the shaft;
a double-acting hydraulic linear actuator having a piston means and a cylinder means, one of the means being pivotally connected to the end of the bell crank and the other of the means being pivotally connected to the inertial mass member, and means for directing fluid under pressure into the cylinder means for reciprocating the piston means in the cylinder means and oscillating the inertial mass member relative to the earth coupling member about the shaft; and transport means comprising an upright member disposed on either side of the axis of oscillation, and inflated pillow bag means operatively disposed between each of the upright members and the inertial mass member for transmitting a downwardly directed force from the upright member to the inertial mass member while permitting oscillatory motion of the inertial mass member about the axis of oscillation and absorbing vertical vibration components, and tension means interconnecting each of the upright members and the inertial mass member for lifting the inertial mass member and the earth coupling member for transport.

23. A device for inducing seismic torsional waves having a controlled frequency of prolonged duration in the earth, the device comprising:

an inertial mass member;

an earth coupling member for engaging the surface of the earth disposed below the inertial mass member having a vertically disposed shaft extending through the inertial mass member which serves as an axis of oscillation;

a thrust bearing operatively disposed around the shaft and between the inertial mass member and the earth coupling member for transmitting a downwardly directed force from the inertial mass member to the earth coupling member;

a sprocket means connected to the upper end of the shaft;

a pair of flexible tension members operatively connected to the sprocket means for exerting oppositely directed torques on the sprocket means and on the shaft;

a pair of hydraulic linear actuators each having a piston means and a cylinder means, one of the means of each actuator being connected to one of the tension members and the other means of each actuator being connected to the inertial mass member; and, transport means comprising an upright member disposed on either side of the axis of oscillation, inflated pillow bag means operatively disposed between each of the upright members and the inertial mass member for transmitting a downwardly directed force from the upright member to the inertial mass member while permitting oscillatory motion of the inertial mass member about the axis of oscillation and absorbing vertical vibration components, and tension means interconnecting each of the upright members and the inertial mass member for lifting the inertial mass member and the earth coupling member for transport.

24. A device for inducing seismic torsional waves having a controlled frequency of prolonged duration in the earth, the device comprising:

an earth coupling member for engaging the earth and having a vertically disposed axis of oscillation;

at least two inertial mass members disposed generally on opposite sides of the axis of oscillation; and, motor means interconnecting each of the inertial mass members and points on the earth coupling member spaced from the axis of oscillation for synchronously moving the members in such a manner as to produce reciprocating component motion along a line disposed normal to a line extending radially from the axis of oscillation, whereby the reaction forces will oscillate the earth coupling member about the vertically disposed axis of oscillation and will induce a seismic torsional shear wave in the earth;

and transport means operatively connected to one of the members for lifting the members from the earth for transport and for lowering the coupling member into contact with the surface of the earth and applying a downwardly directed holddown force, the transport means having at least one thrust bearing means for permitting rotational motion of the member to which the transport means is connected about the vertically disposed axis and relative to the transport means.

References Cited by the Examiner
UNITED STATES PATENTS

| 2,803,433 | 8/1957 | Smith | 173—93 X |
| 2,906,502 | 9/1959 | Smith | 91—339 X |
| 3,024,861 | 3/1962 | Clynch | 181—.5 X |
| 3,034,594 | 5/1962 | Menzel et al. | 181—.5 X |

BENJAMIN A. BORCHELT, *Primary Examiner.*

SAMUEL FEINBERG, *Examiner.*

G. H. GLANZMAN, *Assistant Examiner.*

UNITED STATES PATENT OFFICE
CERTIFICATE OF CORRECTION

Patent No. 3,280,935                                October 25, 1966

Graydon L. Brown

It is hereby certified that error appears in the above numbered patent requiring correction and that the said Letters Patent should read as corrected below.

In the heading to the printed specification, line 5, for "of Oklahoma" read -- of Delaware --; column 24, line 51, for "group" read -- ground --; column 28, line 15, for "connection means" read -- connection to means --; column 29, line 26, after "member" insert -- and --.

Signed and sealed this 5th day of September 1967.

(SEAL)
Attest:

ERNEST W. SWIDER                                        EDWARD J. BRENNER
Attesting Officer                                               Commissioner of Patents